(12) United States Patent
Takato

(10) Patent No.: US 7,982,975 B2
(45) Date of Patent: Jul. 19, 2011

(54) OBJECTIVE OPTICAL SYSTEM

(75) Inventor: Hideyasu Takato, Tokyo (JP)

(73) Assignee: Olympus Medical Systems Corp., Tokyo (JP)

( * ) Notice: Subject to any disclaimer, the term of this patent is extended or adjusted under 35 U.S.C. 154(b) by 147 days.

(21) Appl. No.: 12/472,518

(22) Filed: May 27, 2009

(65) Prior Publication Data

US 2010/0142058 A1    Jun. 10, 2010

(30) Foreign Application Priority Data

Jun. 6, 2008    (JP) .................................. 2008-148995

(51) Int. Cl.
*G02B 9/00* (2006.01)
(52) U.S. Cl. ........................................ 359/754; 359/785
(58) Field of Classification Search .......... 359/785–790, 359/690
See application file for complete search history.

(56) References Cited

U.S. PATENT DOCUMENTS

| | | | | |
|---|---|---|---|---|
| 4,764,000 | A * | 8/1988 | Tokumaru ..................... | 359/745 |
| 6,115,188 | A | 9/2000 | Nishio et al. | |
| 7,813,057 | B2 * | 10/2010 | Lin ................................ | 359/775 |
| 2007/0258150 | A1 | 11/2007 | Takato | |
| 2009/0284846 | A1 * | 11/2009 | Teraoka et al. ............... | 359/785 |

FOREIGN PATENT DOCUMENTS

| | | |
|---|---|---|
| JP | S55-090928 | 7/1980 |
| JP | H-06-317744 | 11/1994 |
| JP | 8-50237 | * 2/1996 |
| JP | H11-316339 | 11/1999 |
| JP | 2000-267002 | 9/2000 |
| JP | 2004-313769 | 11/2004 |
| JP | 2004-313772 | 11/2004 |
| JP | 2007-233036 | 9/2007 |
| JP | 2007-260305 | 10/2007 |
| JP | 2007328014 A | 12/2007 |

* cited by examiner

*Primary Examiner* — Jordan M. Schwartz
(74) *Attorney, Agent, or Firm* — Arnold International; Bruce Y. Arnold

(57) ABSTRACT

The invention relates to a high-performance imaging optical system that achieves a magnification high enough to be capable of microscopic viewing under an endoscope, and is compatible with high-definition imaging devices. The objective optical system comprises, at least in order from the object side, a positive, first group G1, a second group G2 and a third group G3. In association with an object point change, at least the second group G2 is moved along an optical axis. The objective optical system satisfies a condition with respect to an optical magnification $\beta$ upon focusing on the closest range.

1 Claim, 32 Drawing Sheets

Example 1

Example 2

Example 3

Example 4

Example 5

Example 6

Example 7

Example 8

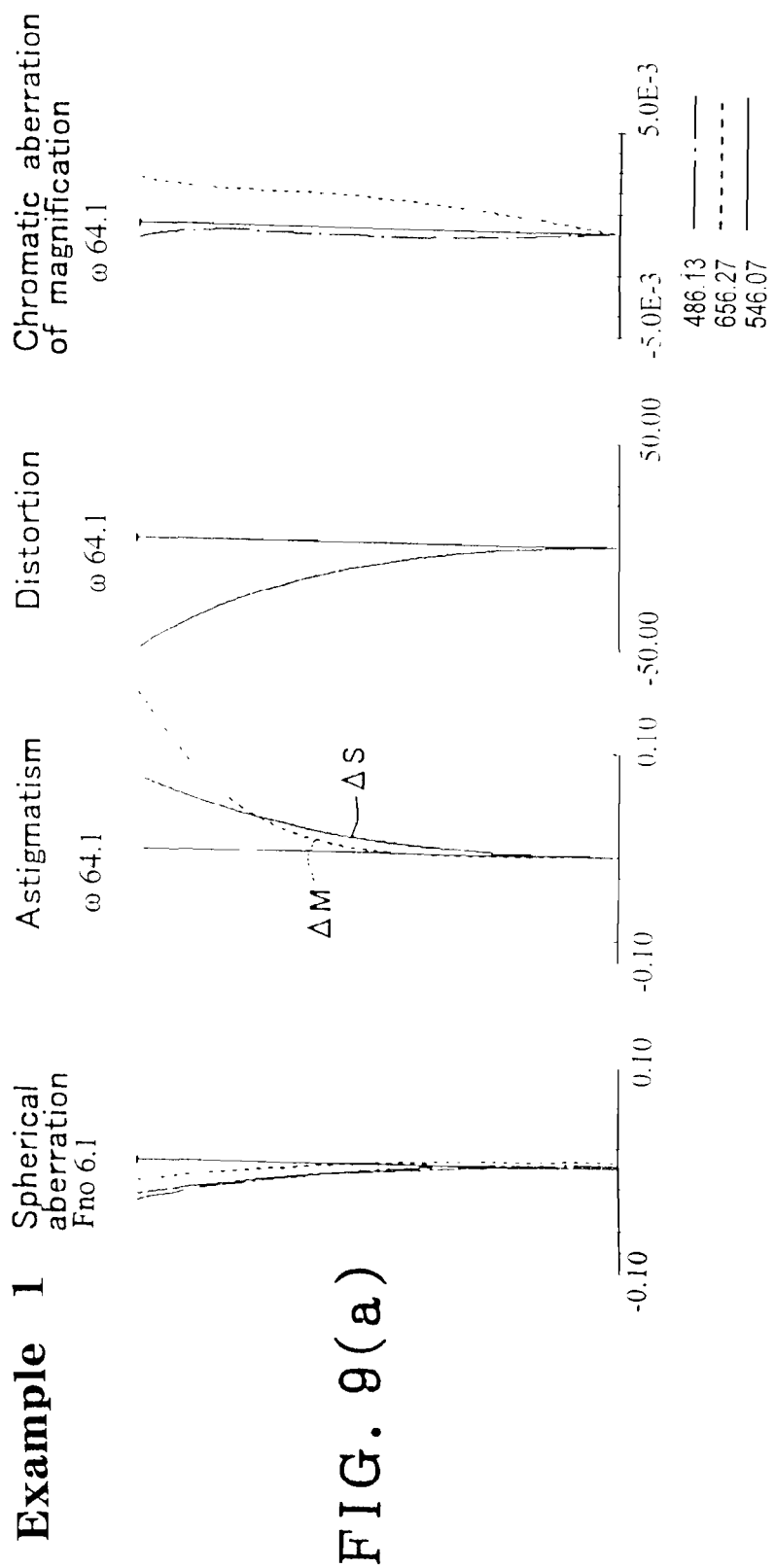
FIG. 9(a) Example 1

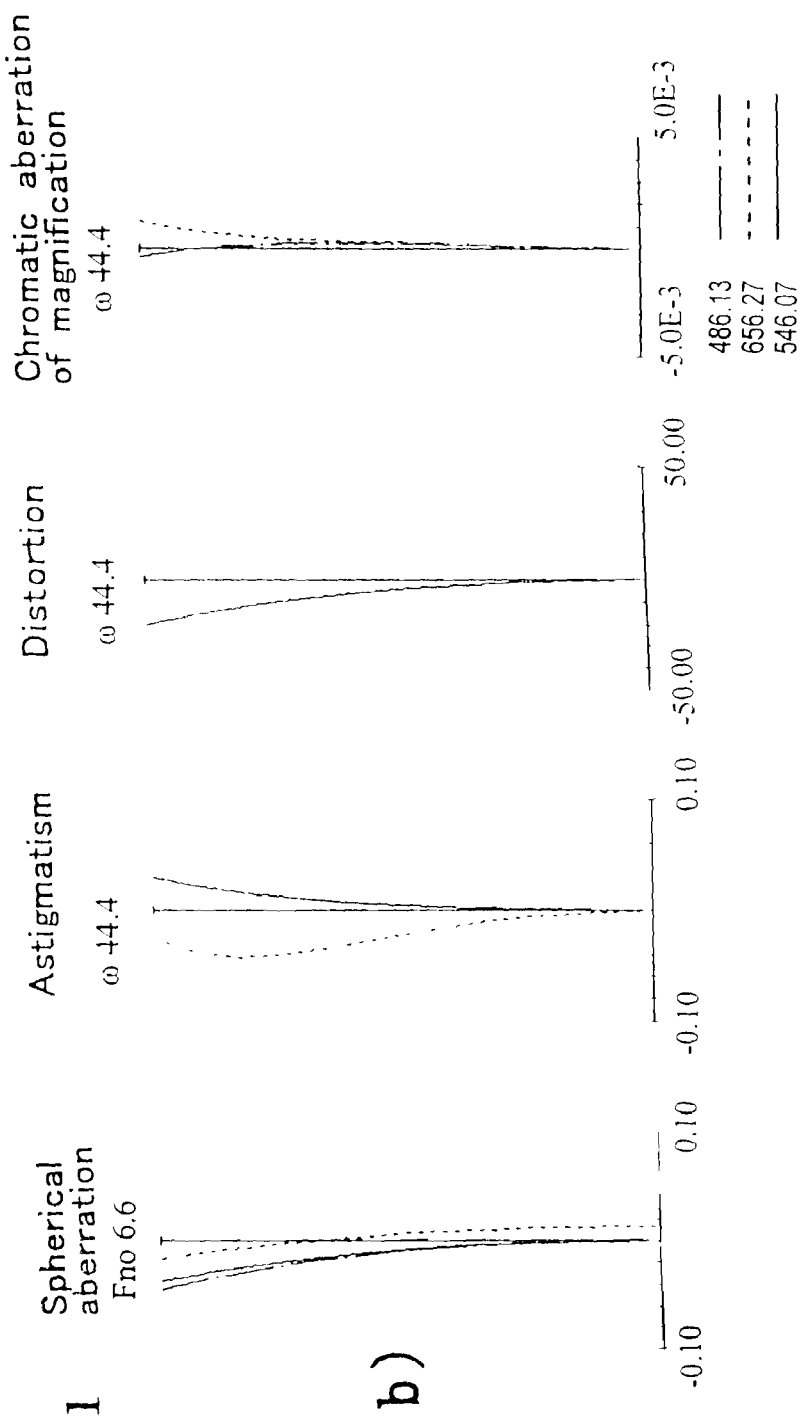

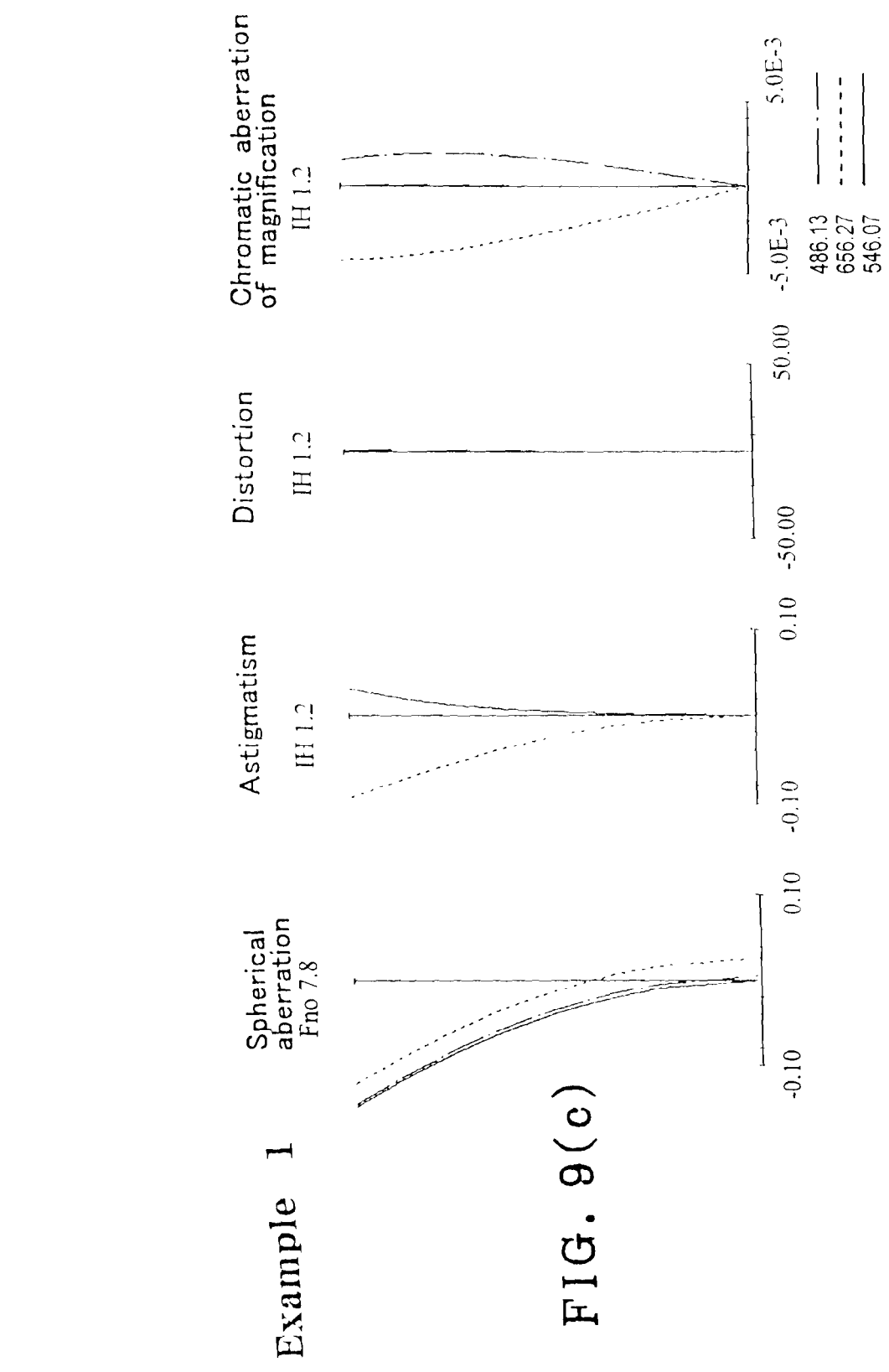
FIG. 9(c) Example 1

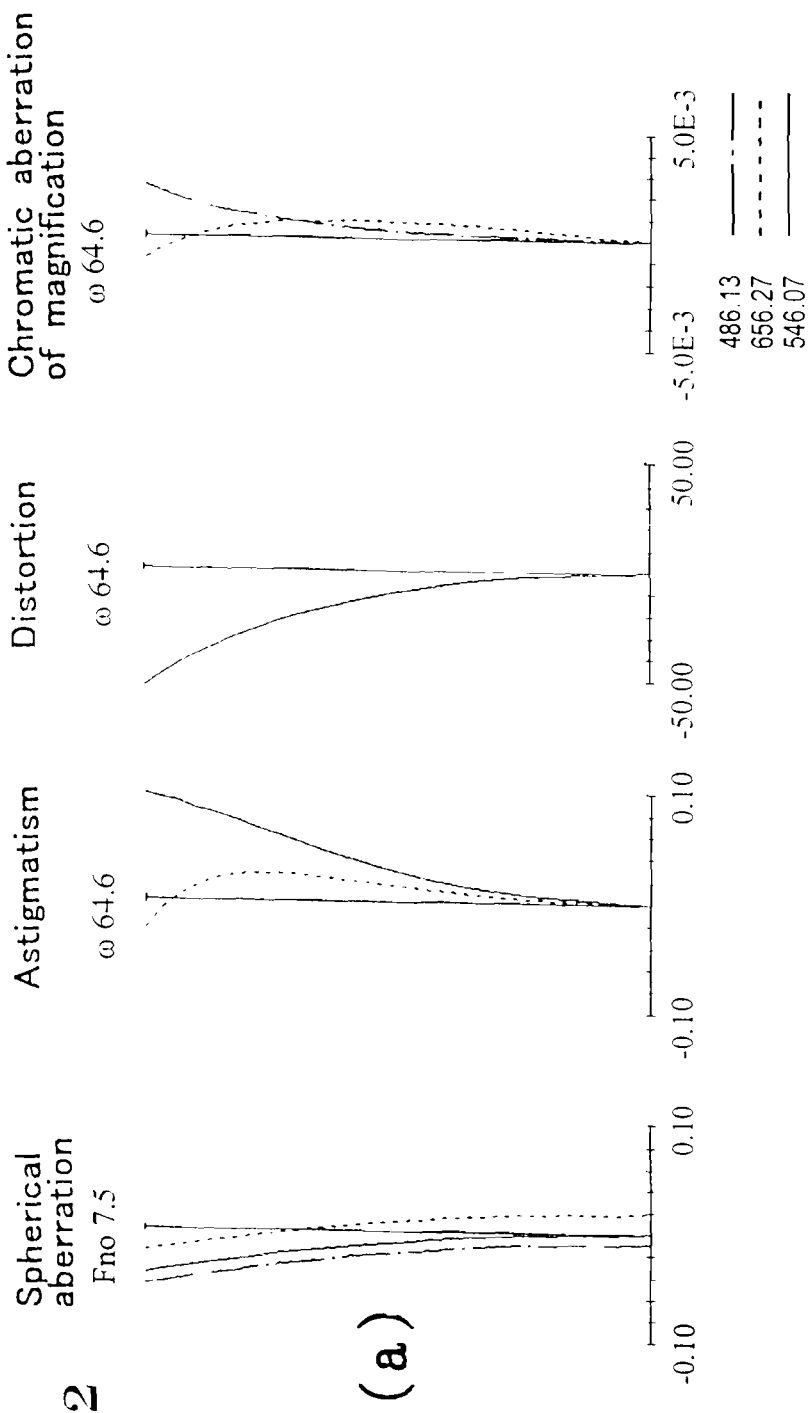

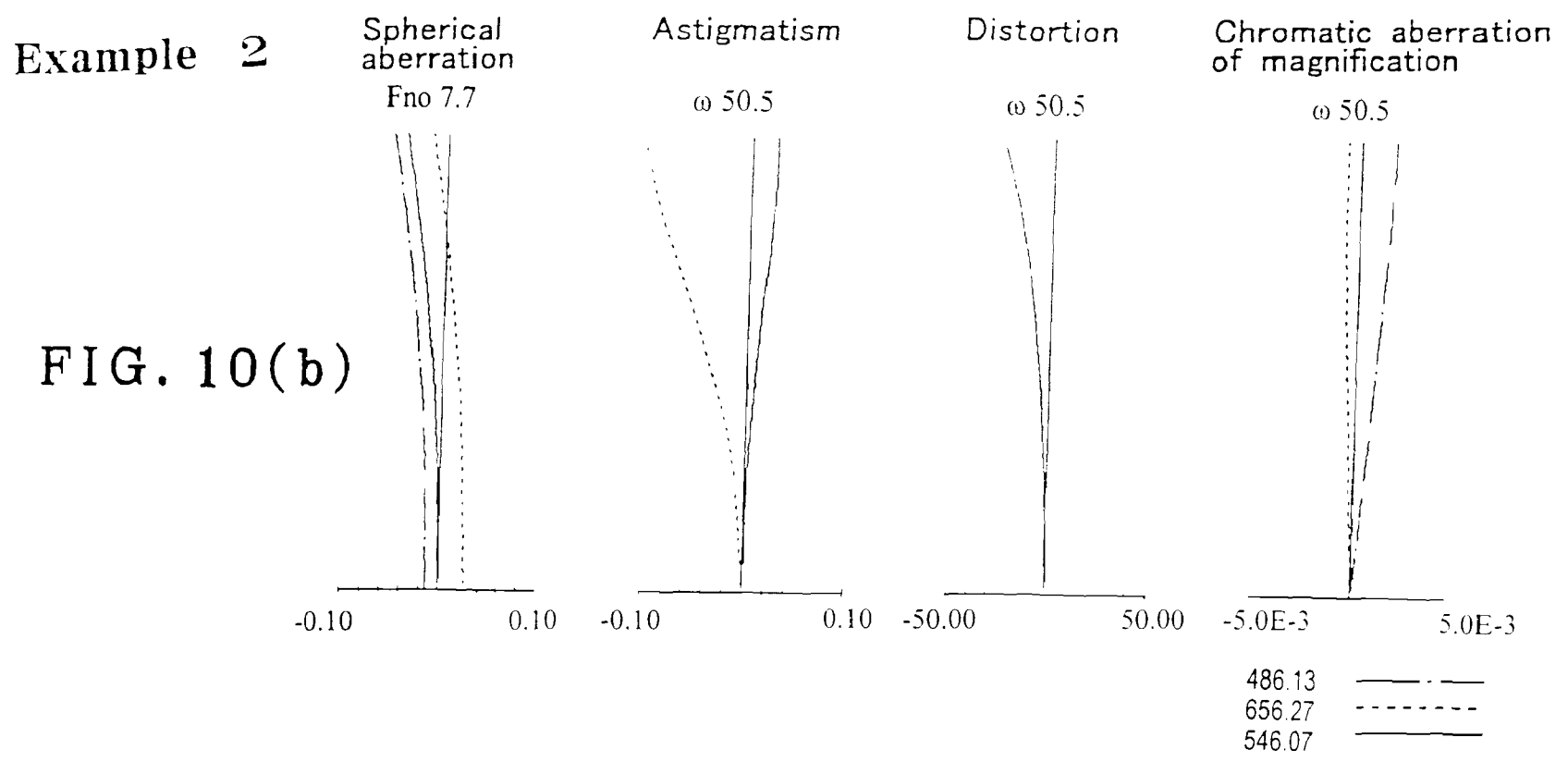

Example 2

FIG. 10(b)

| Spherical aberration Fno 7.7 | Astigmatism ω 50.5 | Distortion ω 50.5 | Chromatic aberration of magnification ω 50.5 |

-0.10 — 0.10    -0.10 — 0.10    -50.00 — 50.00    -5.0E-3 — 5.0E-3

486.13
656.27
546.07

Example 2

Example 3

Example 3

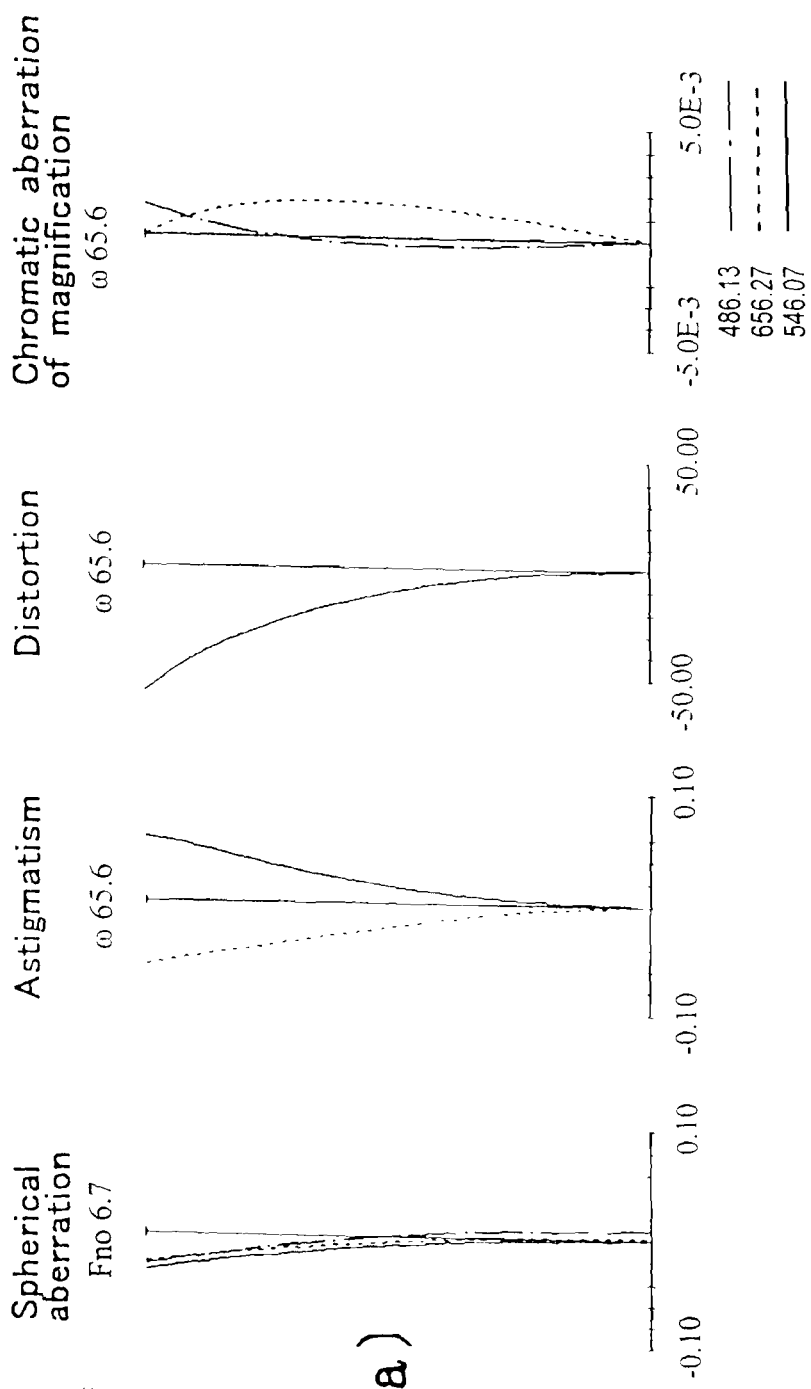

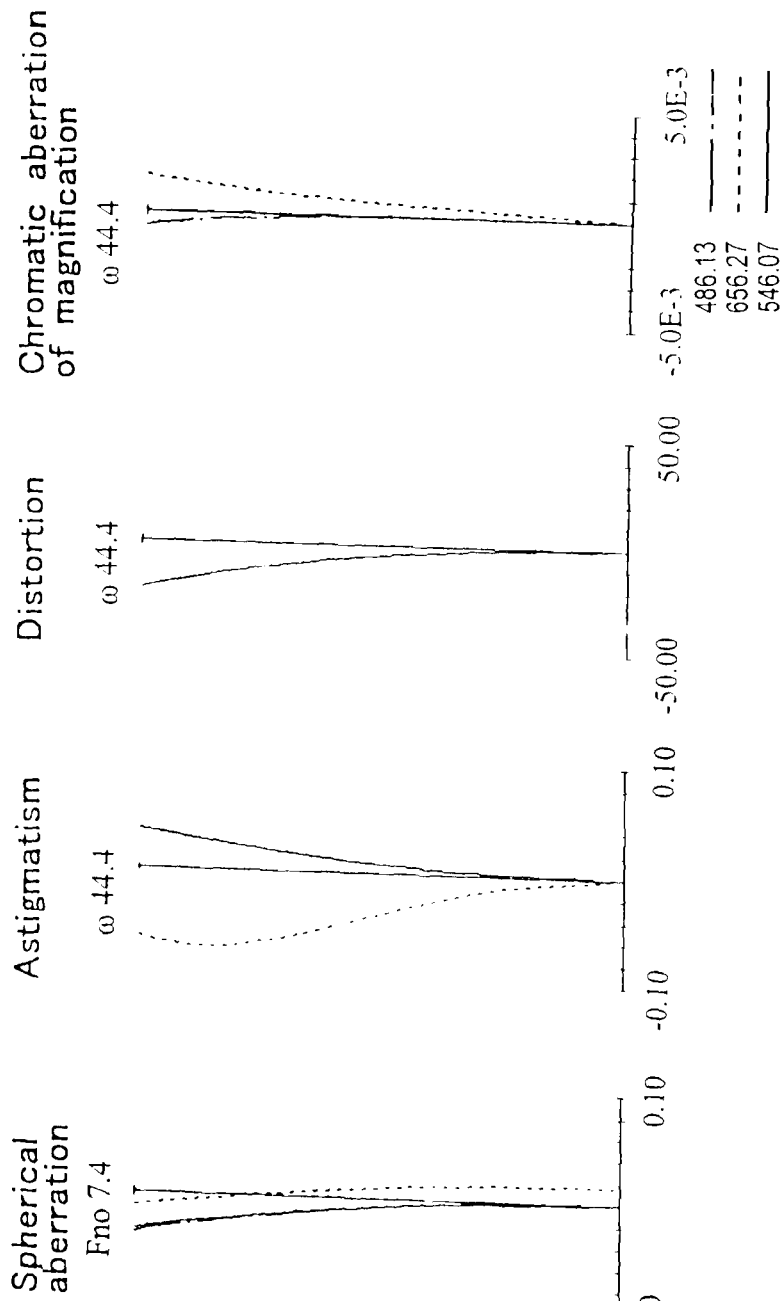

Example 5

FIG. 13(a)

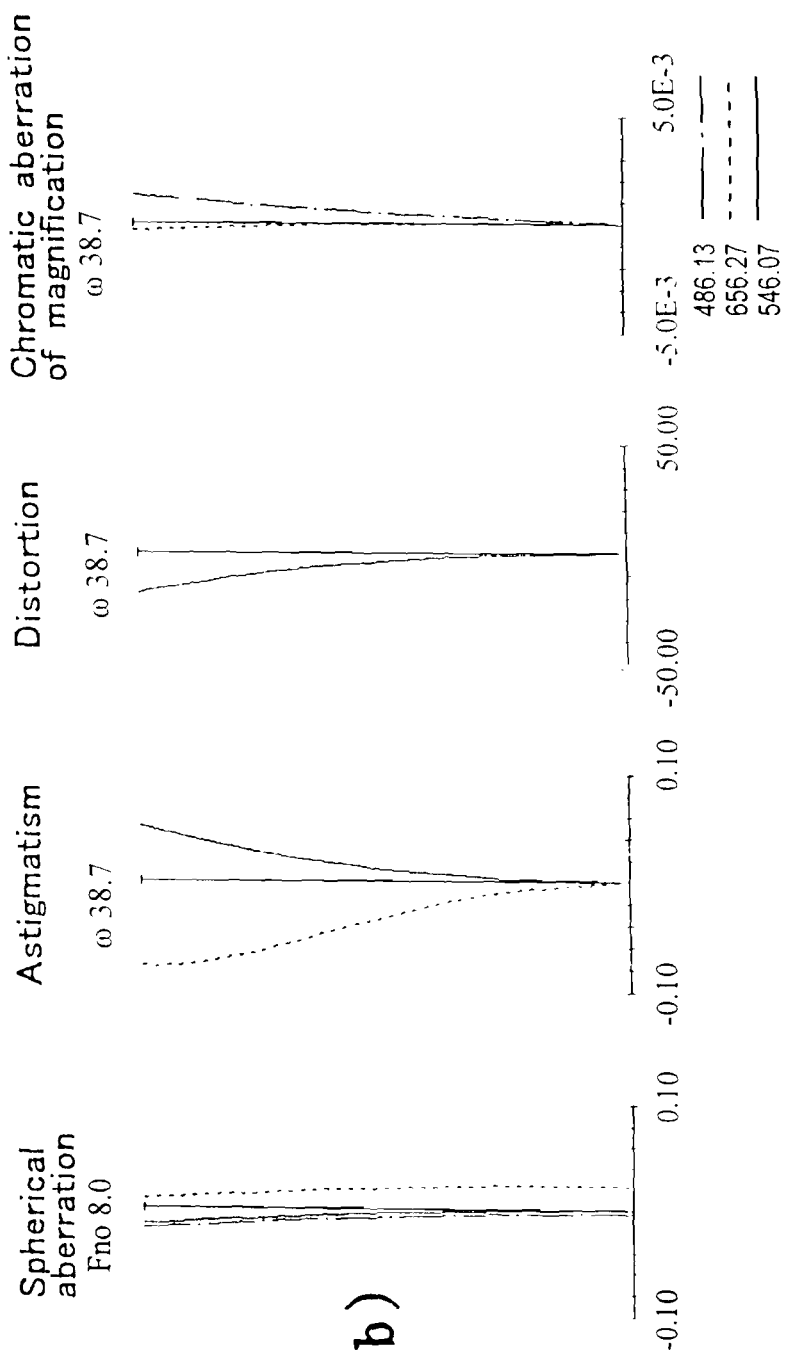

Example 5

Example 6

Example 6

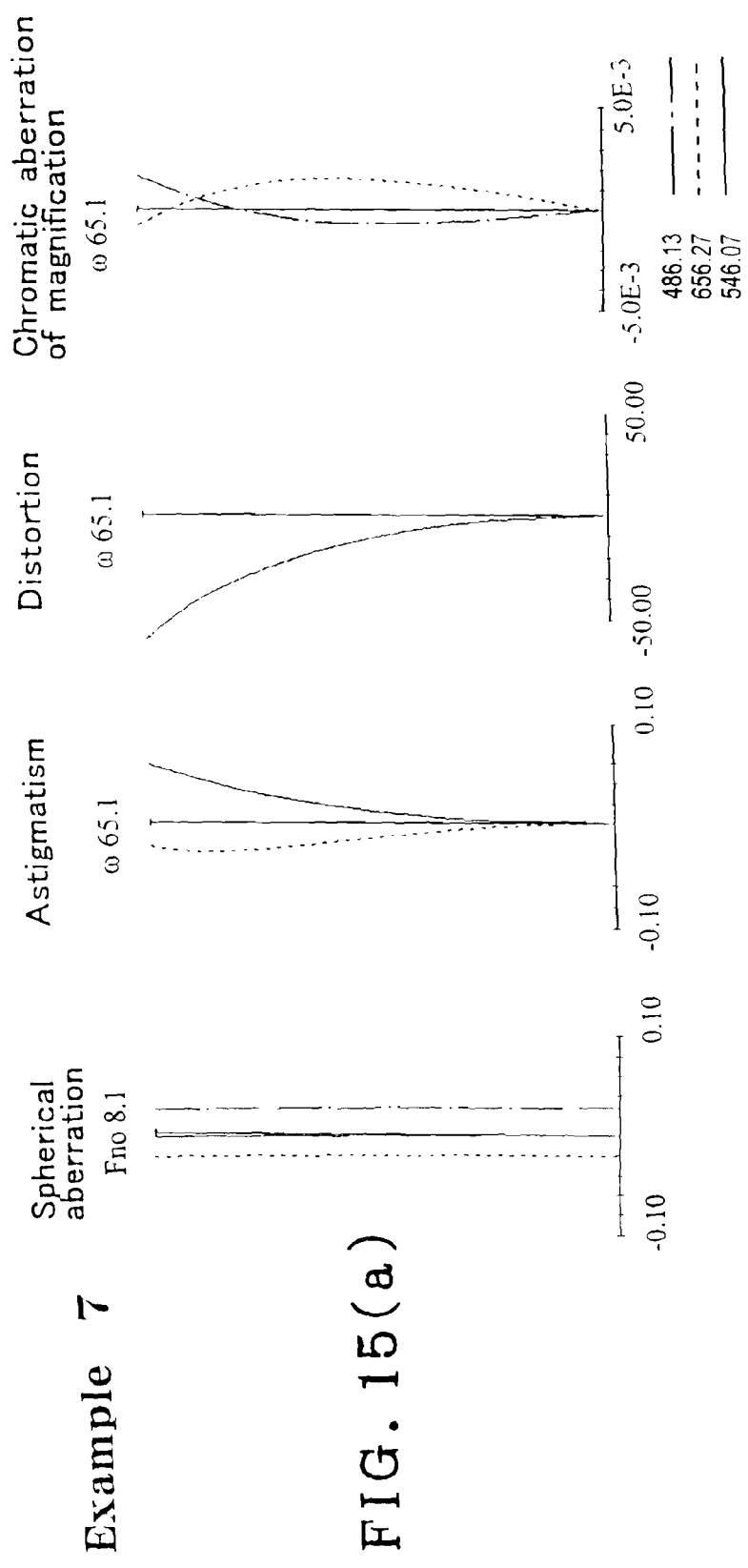
FIG. 15(a) Example 7

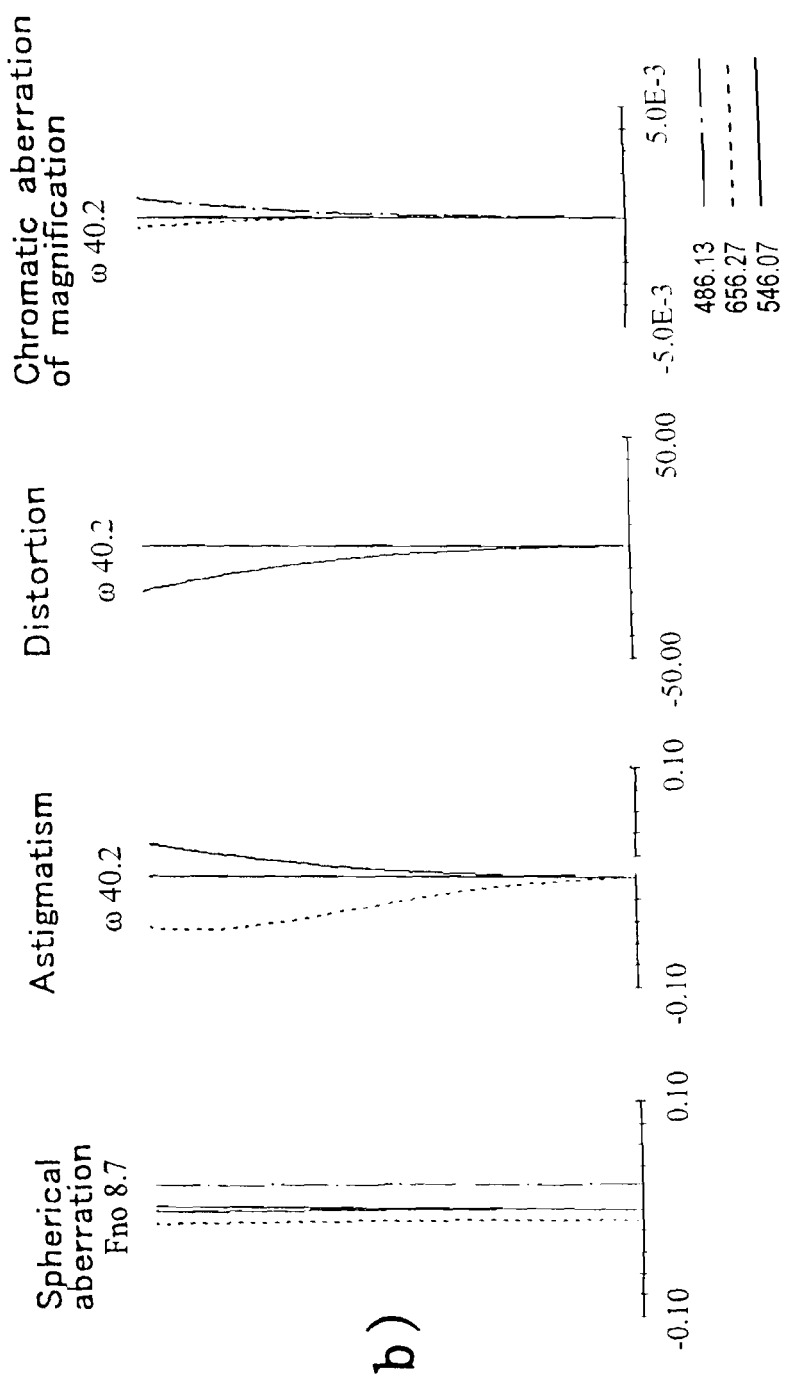
FIG. 15(b) Example 7

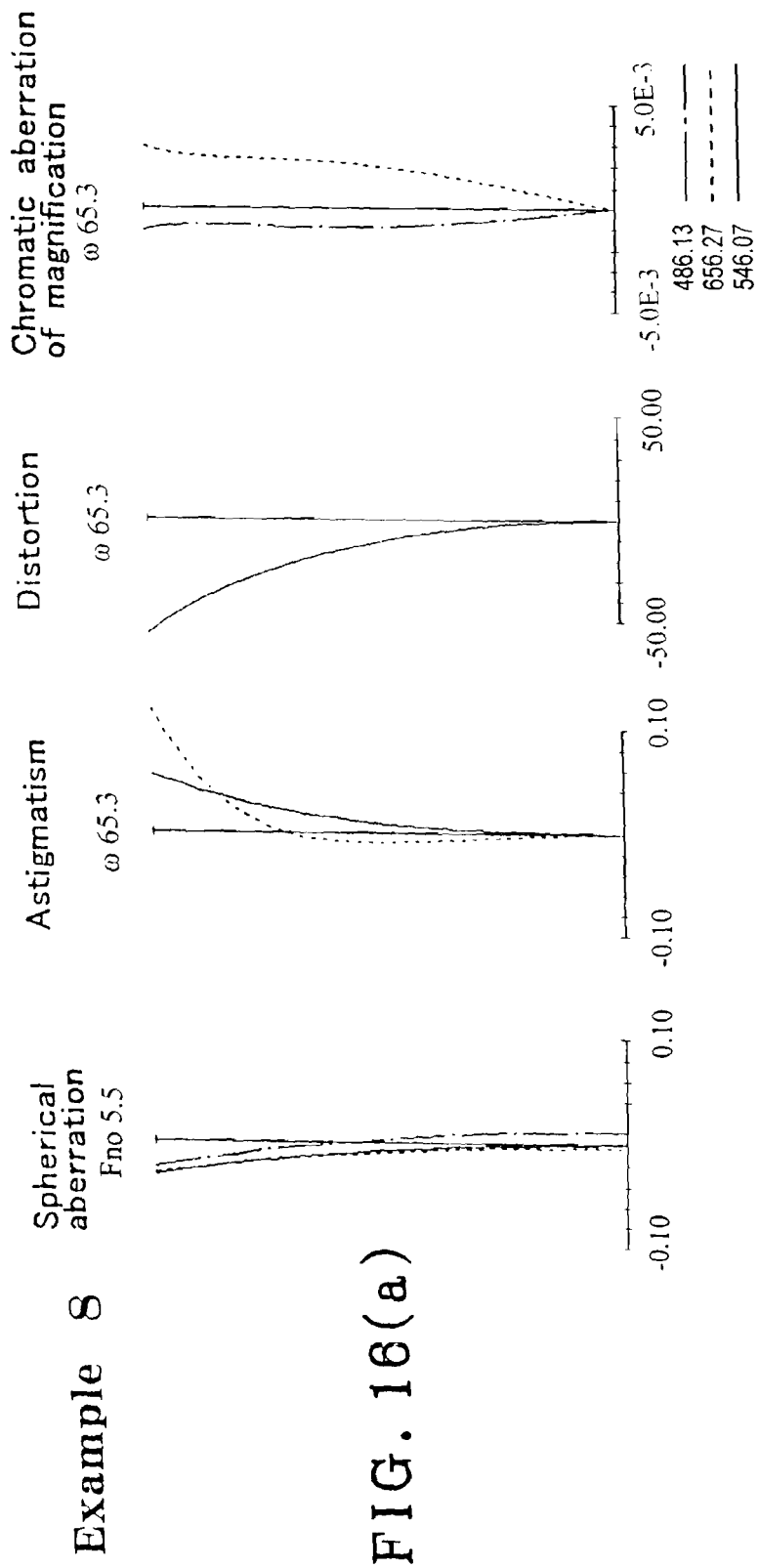

Example 8

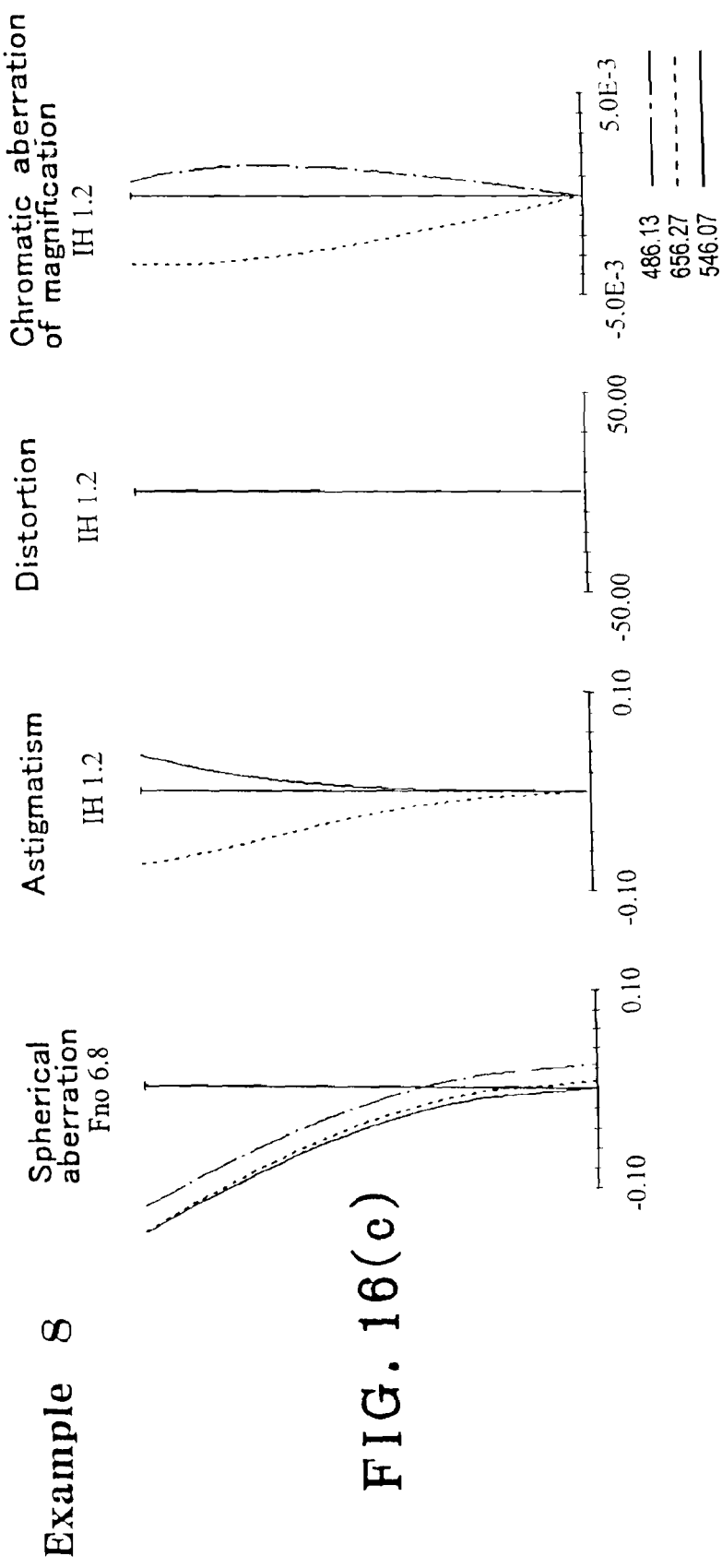

OBJECTIVE OPTICAL SYSTEM

BACKGROUND OF THE INVENTION

The present invention relates generally to an objective optical system, and more specifically to an objective optical system having a focusing function. For instance, the invention relates to an endoscope objective lens capable of enlarged-scale proximity viewing, or a taking lens for digital or video cameras capable of microphotography, commercially marketable small-format cameras, and so on.

In the medical endoscope field, there has recently been mounting demand for an optical system capable of implementing enlarged-scale closeup viewing for close examinations of lesions. Such an enlarged-scale view endoscope objective lens is broadly broken down into two types: one comprising +−+ three groups wherein the negative, second group moves for focusing on a near point, as set forth in Patent Publications 1, 2 and 3, and another comprising −+− three groups wherein the positive, second group moves for focusing, as disclosed in Patent Publication 4.

Allowing endoscopic images to have even higher quality has also been demanded so as to improve the precision of diagnosis, and so imaging devices having a lot more pixels than ever before are now being used. There is thus demand for high-performance imaging devices more compatible with imaging devices having an increasing number of pixels.

For endoscopic diagnosis of biotissues such as lesions, on the other hand, there has been mounting demand for optical systems capable of implementing ultra-enlarged-scale closeup (microscopic) viewing as much as microscopes can. An endoscope objective optical system allowing such endoscopic viewing to be extended to microscopic viewing of cells or the like is set forth in Patent Publications 5 to 8, etc.

So far for microscopic viewing of biotissues, there has been no option but to identify a lesion by endoscopic viewing and, thereafter, take some cells out of it by biopsy for microscopic viewing. However, the above proposals have the merit of providing an extension of endoscopic viewing to in vivo cell viewing.

In the commercial products field including digital cameras, video cameras, etc., too, much is still left to be desired in terms of the high magnifications and size reductions of optical systems for macrophotography or the like.

Patent Publication 1: JP(B) 61-44283
Patent Publication 2: JP(A) 6-317744
Patent Publication 3: JP(A) 11-316339
Patent Publication 4: JP(A) 2000-267002
Patent Publication 5: JP(A) 2004-313769
Patent Publication 6: JP(A) 2004-313772
Patent Publication 7: JP(A) 2007-233036
Patent Publication 8: JP(A) 2007-260305

With the optical systems set forth in Patent Publications 2 to 4 or 7 of the above prior arts, magnifications at the time of enlarged-scale closest range viewing are not high enough for microscopic viewing.

Patent Publication 1 comes up with an enlarged-scale, high-magnification endoscope object lens; however, it has some practical problems, because the field of view upon normal viewing remains narrow, there is the need of implementing in vivo screening to find lesions, much difficulty is encountered in getting on with the affected site, and so on. This endoscope objective lens is also less than satisfactory in terms of resolution of objects upon enlarged-scale viewing because its optical performance is not that good.

The optical system for microscopic viewing set forth in Patent Publications 5 and 6 is provided separately of an optical system that implements normal endoscopic viewing, because it has fixed magnification and is only capable of implementing enlarged-scale closeup viewing.

In practical microscopic viewing, an optical module for microscopic viewing must be guided to a subject via a scope attachments insertion channel. For this reason, there is parallax occurring upon switching endoscopic viewing over to microscopic viewing, and so much difficulty is experienced in identifying the range of where to view. Further, it is difficult to fix the optical system for microscopic viewing to the site being viewed, because its diameter is small. In other words, those who can handle this scope capable of microscopic viewing are limited to a skilled expert or physician alone.

To allow the operator to have a sense of security in manipulating the scope during microscopic viewing, two optical systems may possibly be laid out in a single endoscope apart from the attachments insertion channel. However, this is nothing else but a single unit with two scopes combined in it, and gives rise to outer diameter increases in particular, which would make the burden too heavy for patients.

In consideration of the above problems, some of Patent Publication 7 or Patent Publication 8 discloses an optical system designed such that viewing from normal endoscopic viewing to enlarged-scale closeup microscopic view can be implemented with a single optical system. The optical system set forth in Patent Publication 7 is less than satisfactory for microscopic viewing, because the maximum magnification at the nearest point is a bit lower. When it comes to monitor viewing, electronic enlargement is needed to obtain sufficient magnifications; although there is a high viewing magnification obtained, yet the resolution of images remains low, often resulting in image deterioration.

The optical system disclosed in Patent Publication 8 is satisfactory in terms of the maximum magnification, but focusing is implemented by movement of two groups. For this reason, there is the need of mounting a driving mechanism of implicated construction on it, which is a factor of size increases. In addition, lens control is difficult to gain because of quite independent movement of moving lens groups.

SUMMARY OF THE INVENTION

Having been made with such problems with the prior art in mind, the present invention has for its one object the provision of a high-performance imaging optical system that achieves a magnification high enough to enable microscopic viewing under an endoscope and is better compatible with a high-definition imaging device. Another object of the invention is to provide an optical system applicable even to macrolenses capable of high-magnification photography in digital cameras or cameras for cellular phones compatible with small-format CCDs.

According to the first aspect of the invention, the above objects are accomplishable by the provision of an objective optical system, characterized by comprising, at least in order from an object side thereof, a positive, first group, a second group and a third group, wherein in association with an object point distance change, at least said second group is moved along an optical axis for focusing, with the satisfaction of the following condition.

$$|\beta| > 1.8 \quad (1)$$

Here $\beta$ is an optical magnification upon focusing on the closest range.

The requirements for, and the advantages of, the above arrangement are now explained.

To make it possible to implement viewing from normal endoscopic viewing to microscopic viewing with a single optical system, there are a plurality of lens groups provided wherein at least one is allowed to move on the optical axis so that focusing can be implemented even upon closeup viewing at the closest object point where normal endoscopic viewing switches over to microscopic viewing. The maximum magnification β upon focusing on the closest range to implement good enough microscopic viewing must satisfy Condition (1).

According to the second aspect of the invention directed to a lens arrangement making sure such magnifications, there is an objective optical system provided, which is characterized by comprising, in order from an object side thereof, a positive, first group, a negative, second group and a positive, third group, wherein in association with an object point distance change, said second group is allowed to move along an optical axis for focusing, with the satisfaction of the following condition (1).

$$|β|>1.8 \quad (1)$$

Here β is an optical magnification upon focusing on the closest range.

For instance, to make it possible to view lesions in biotissues on a cell level and view a phenomenon coming to appear specifically at the time of canceration of normal cells by reason of disordered cell arrangements, abnormal thickening of cell nuclei, abnormal proliferation of capillaries surrounding a cell nucleus, etc., it is vitally required to satisfy at least Condition (1) upon focusing on the closest range and take hold of the resolving power necessary for microscopic viewing in a field-of-view range of a few 10 μm² to a few hundreds μ².

When the inventive objective optical system is combined with an imaging device having a lot more pixels, there is a resolving power of a few μm to several tens μm obtained by the satisfaction of Condition (1). Consider here the case of displaying and viewing images on a 19-inch monitor. There is a magnification of the order of 200 to 500 obtained that enables viewing on a cell level. This in turn allows the operator to view the phenomenon coming to appear specifically at the time of canceration of normal cells by reason of disordered cell arrangements, abnormal thickening of cell nuclei, abnormal proliferation of capillaries surrounding a cell nucleus, etc.

When Condition (1) is not satisfied or |β| is not greater than 1.8, there is a shortage of magnification with the optical system alone, which may possibly be compensated for by use of electrical correction means such as electronic zooming; however, the ensuing images are not preferable for diagnosis of lesions because there is image deterioration unless aberrations are corrected with high precision.

Such microscopic viewing should preferably be implemented while the endoscope's leading end is fixed in contact with the site to be viewed. A very narrow range is viewed at high magnifications: if that leading end is engaged with the biotissue, it is then possible to prevent shakes, giving stable images.

According to the third aspect of the invention, there is an objective optical system provided, which is characterized by comprising, in order from an object side thereof, a first lens group of positive refractive power, a second lens group of negative refractive power, and a third lens group of positive refractive power, wherein in association with an object point distance change, among the first lens group, the second lens group, and the third lens group, only said second lens group is moved along an optical axis for focusing, with satisfaction of the following conditions (2) and (3):

$$0.7<f_1/f<1.0 \quad (2)$$

$$1.62<f_2/f_1<2.75 \quad (3)$$

where f is the focal length of the whole system upon focusing on a far point, $f_1$ is the focal length of the first lens group, and $f_2$ is an absolute value of the focal length of the second lens group.

According to the fourth aspect of the invention, there is an objective optical system provided, which is characterized by comprising, in order from an object side thereof, a positive, first group, a negative, second group and a positive, third group, wherein in association with an object point distance change, said second group is moved together with a stop along an optical axis for focusing, with the satisfaction of the following condition (4).

$$0.25<f_1/f_3<0.45 \quad (4)$$

Here $f_1$ is the focal length of the first group, and $f_3$ is the focal length of the third group.

The objective optical system according to the above third, and fourth aspect is constructed of three groups, +, − and +, and designed such that the negative, second group is moved in the optical axis direction thereof for focusing. If the second group is constructed of a lens having negative refracting power with an aperture stop located near it, it is then possible to diminish the outer diameter of the moving lens. This makes it possible to easily locate a mechanism for moving the moving lens in the optical axis direction (e.g., an actuator that is connected to a lens frame for holding the moving lens and gives driving force to that lens frame) around the moving lens. It is also possible to reduce lens weight thereby reducing loads applied on the mechanism for moving the moving lens.

Condition (2) in the above third aspect of the invention is about the focal length of the first group.

$$0.7<f_1/f<1.0 \quad (2)$$

Here f is the focal length of the whole system used for normal viewing (upon focusing on a far point), and $f_1$ is the focal length of the first group.

Being short of the lower limit of 0.7 to Condition (2) is not preferable, because there is a large field curvature produced, which causes an image plane to become minus in an normal viewing state. As the upper limit of 1.0 is exceeded, it causes the total length to grow long, incurring size increases. Especially in the case of an endoscope, the increase in the total length of the imaging optical system is not preferable, because it means that the hard (unbendable) portion of the endoscope's leading end grows long, imposing increasing loads on the patient upon insertion through the body.

The upper limit of Condition (2) should preferably be set at 0.95, as in the following condition (2').

$$0.7<f_1/f<0.95 \quad (2')$$

For the total length it is preferable to lie within the range of Condition (2), but the upper limit should more preferably be set at 0.95, as in Condition (2'), to mount the inventive objective optical system on an endoscope.

Likewise, Condition (3) in the third aspect of the invention defines the focal length ratio between the second and the first group, and is all about correction of spherical aberrations and chromatic aberrations.

$$1.62<f_2/f_1<2.75 \quad (3)$$

Here $f_1$ is the focal length of the first group, and $f_2$ is the absolute value of the focal length of the second group.

As there is a departure from the range of Condition (3), it incurs image quality deterioration because of the inability to correct chromatic aberration of magnification. As the lower limit of 1.62 is not reached or the focal length of the second group becomes relatively too small with respect to the focal length of the first group, it is not preferable because the C-line becomes under and the F-line becomes over. Conversely, as the upper limit of 2.75 to Condition (3) is exceeded or the focal length of the second group grows relatively long, it is again not preferable because the C-line becomes too over and the F-line becomes too under. When the lower limit of Condition (3) is not reached, there are also influences on spherical aberrations and longitudinal chromatic aberration. Here spherical aberrations become under: they tilt largely at the time of closest-range viewing in particular. This is also not preferable for longitudinal chromatic aberration because the F-line remains overcorrected, and for coma as well, because of difficulty in correction of it.

Condition (4) in the fourth aspect of the invention defines the focal length ratio between the first and the third group, and is all about correction of chromatic aberrations and field curvature.

$$0.25 < f_1/f_3 < 0.45 \quad (4)$$

Here $f_1$ is the focal length of the first group, and $f_3$ is the focal length of the third group.

A departure from the range of Condition (4) is not preferable because there are increasing image plane fluctuations at the time of normal viewing and closest-range viewing. As the lower limit of 0.25 is not reached, it causes field curvature to become over at the time of normal viewing, and become under at the time of closest-range viewing. Conversely, as the upper limit of 0.45 is exceeded, it causes field curvature to become under at the time of normal viewing and become over at the time of closest-range viewing.

When there is a deviation from the upper limit of Condition (4), it renders correction of chromatic aberration of magnification difficult, and incurs image quality deterioration because the C-line becomes under and the F-line becomes over.

For the aperture stop located before and after the first, and the second group it is preferable to move together with the second group having negative refracting power. Here, when the second group moves in such a way as to focus from a far point on the closest object point, the aperture stop moves together with the second group from the object side to the image side.

Assume here that the stop remains fixed. The negative, second group would go far away from an exit pupil position upon closest-range viewing; so light rays of a rim light beam would gain some height at the positive, third group. This is not preferable because of an increase in the outer diameter of that third group. If, as contemplated herein, the objective optical system composed of three groups, +, − and +, is set up such that the negative, second group moves in unison with the aperture stop, then it can be kept compact without any increase in the outer diameter of the positive, third lens group.

For the invention it is more preferable to satisfy the following condition (5).

$$0.5 < f_2/f_3 < 1.0 \quad (5)$$

Here $f_2$ is the absolute value of the focal length of the second group, and $f_3$ is the focal length of the third group.

The magnitude of the refracting power of the second group correlates with the magnitude of its movement: the second group has a longer focal length or a smaller refracting power. As the lower limit of 0.5 to Condition (5) is not reached, it causes the amount of movement of the second group to grow large. Especially when an actuator is used as lens driving means, it causes a lens drive stroke to grow long: it may possibly render the lens driving mechanism including the actuator large or complicate. As the upper limit of 1.0 to Condition (5) is exceeded or the amount of movement of the second group gets small, focusing sensitivity grows too high. Especially at an object point approximate to closest-range viewing, even a bit movement of the lens could trigger off budging of an imaging plane, rendering focusing difficult.

In addition, as the lower limit of Condition (5) is not reached, the focal length of the third group grows long, resulting in an increase in the back focus of the objective lens. This is not preferable because of an increase in the total length and size of the imaging optical system including an imaging device.

If Condition (5) reduces down to the following condition (5'), then it can work more.

$$0.57 < f_2/f_3 < 0.90 \quad (5')$$

Setting the lower limit of Condition (5) at 0.57 is more preferable because focusing sensitivity gets much lower, and setting the upper limit at 0.90 works more for total length reductions.

For the invention it is more preferable to satisfy Condition (6).

Condition (6) is provided to impose direct limitation on the amount of movement of the second group in association with Condition (5).

$$0.07 < \Delta_{2G}/LTL < 0.21 \quad (6)$$

Here $\Delta_{2G}$ is the amount of movement of the second group upon focusing from a far point to the closest range, and LTL is the total lens length (the distance from the first surface to the imaging plane).

Being short of the lower limit of 0.07 to Condition (6) is not preferable because of too small an amount of movement of the second group from normal viewing for far points to enlarged-scale closeup viewing, and increasing focusing sensitivity. Exceeding the upper limit of 0.21 is again not preferable because the amount of movement grows too large and with this, the total length grows long.

For the imaging device having a lot more pixels here, it is preferable to satisfy the following condition (7).

$$0.5 < (P/|\beta|)/IH < 2.0 \quad (7)$$

Here P is the pixel pitch in μm of the imaging device located on the image plane, β is an optical magnification upon focusing on the closest range, and IH is the maximum image height in mm at the imaging device located on the image plane.

As the lower limit of 0.5 to Condition (7) is not reached, it allows the pixel pitch to become fine, making sure a lot more pixels, but the optical system is more susceptible to diffraction, and so there is sufficient depth of viewing unavailable at each object point position. As the upper limit of 2.0 to Condition (7) is exceeded, it could no longer allow for an imaging device having an increasing number of pixels. It would also be impractical because an attempt to obtain an image having much more pixels would lead to the need of having extremely high optical magnifications.

In an endoscope objective optical system capable of microscopic, enlarges-scale closest viewing as contemplated herein, too, there are the needs of taking hold of a wide field of view, implementing in vivo screening to find lesions, getting on with the affected sites, and so on. For this reason, it is desired to satisfy the following condition (8) for normal viewing while making sure high magnifications for enlarged-scale viewing.

$$\omega > 50° \quad (8)$$

Here $\omega$ is the maximum angle of view upon viewing a far point.

As far as the range of Condition (8) is satisfied, as wide a field-of-view range as used for medical examination by an endoscope having no function of focusing on near points is secured for medical examination with normal viewing. Thus, even with an endoscope objective optical system capable of microscopic viewing, a wider field of view can be so obtained that normal diagnosis can be implemented with no problem.

For the inventive endoscope objective optical system, it is desired that when the aperture stop moves on the optical axis, the stop diameter remains constant. Mounting a variable stop mechanism on the optical system is not preferable because, combined with the lens driving actuator, etc. located, it gives rise to a further increase in the diameter of the lens barrel for stowing in the imaging optical system.

The inventive objective optical system may also be applied to equipment other than the endoscope. For instance, when macrophotography is implemented at a magnification greater than 1 using a digital camera, a macro-converter lens is often mounted on an imaging optical system, partly because of an increase in the amount of the lens to be let out. However, if the inventive objective optical system is used as the imaging optical system, macrophotography can be implemented at an unheard-of high magnification without recourse to the micro-converter lens.

Generally speaking with a macrolens, focusing is implemented by letting out the first group toward the object side and floating a plurality of groups; however, use of the inventive lens enables macrophotography to be implemented in an inner focus fashion. This works for photography after determination of the working distance.

Further, if the invention is applied to a camera for cellular phones, the operator could enjoy macro-photography conveniently.

According to the invention, it is possible to provide a high-performance imaging optical system that allows for an enlarged magnification capable of microscopic viewing under an endoscope, and that is compatible with high-definition imaging devices. The invention is also applicable to macrolenses or the like capable of high-magnification photography in digital cameras or cellular phone cameras compatible with small-format CCDs.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 9 is an aberration curve diagram for Example 1.

DESCRIPTION OF THE PREFERRED EMBODIMENTS

The embodiment of the inventive endoscope objective optical system is now explained with reference to the following examples.

Example 1

Figures 1A, 1B, 1C:
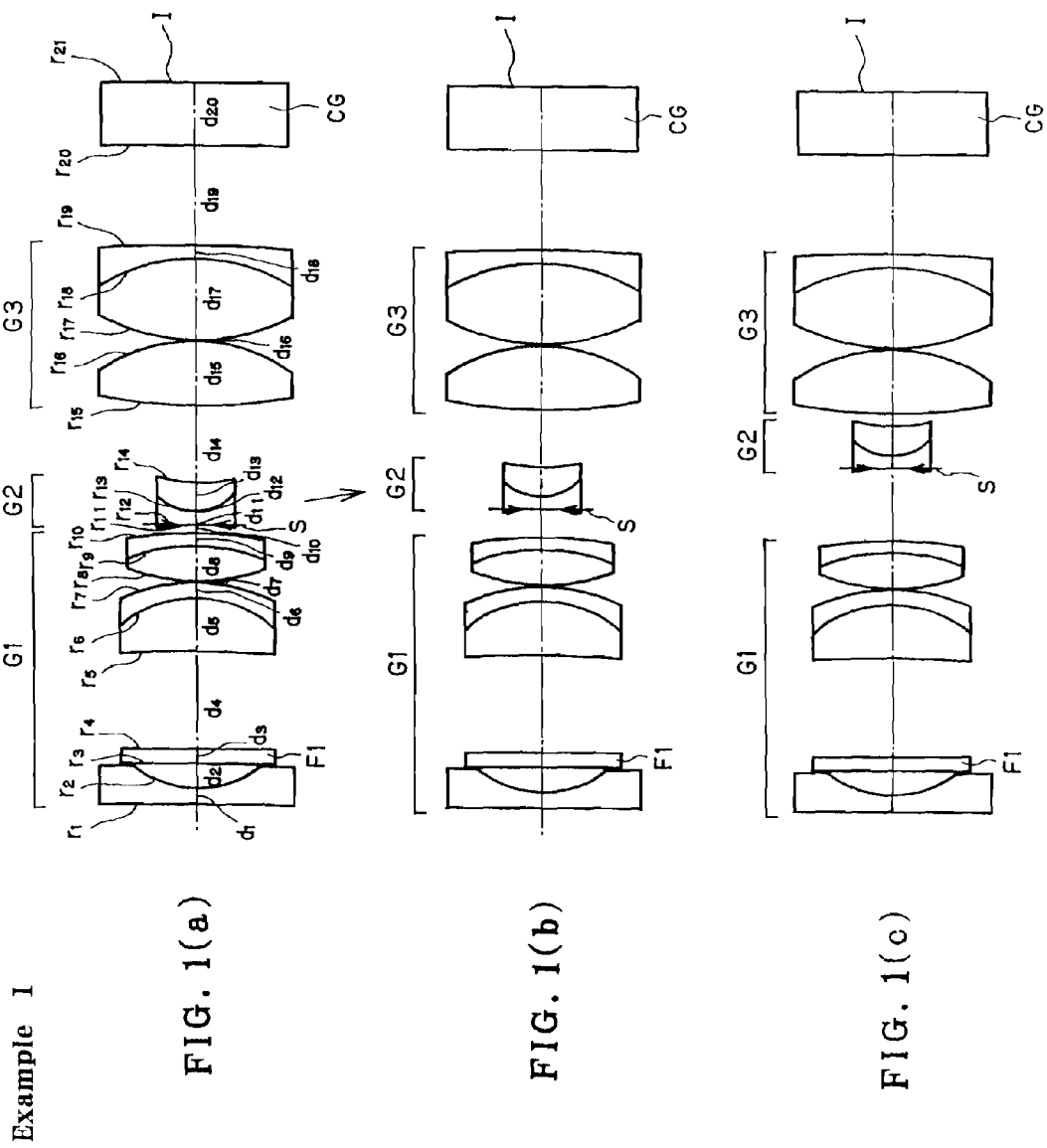
FIG. 1 is illustrative in section of the construction of the endoscope objective optical system according to Example 1.

FIG. 1 is illustrative in section through the optical axis of the construction of the endoscope objective optical system according to Example 1. Numerical data on the example here will be set out in Table 1, given later, and the values of variation parameters in three viewing states: (a) normal viewing, (b) transient and (c) closest-range viewing are tabulated in Table 2, given later. In these numerical data, "No", "r", "d", "ne", and "vd" is indicative of a surface number of an optical surface as counted from the object side, a radius of curvature, a surface-to-surface or air space, an e-line refractive index, and an Abbe constant, respectively. The radius of curvature and the surface-to-surface space are given in mm. Throughout the drawings, the optical surfaces with Nos. 1, 2, 3, . . . annexed to them are indicated by $r_1$, $r_2$, $r_3$, . . . , and the surface-to-surface or air spaces between Surface Nos. 1 and 2, 2 and 3, 3 and 4, . . . are indicated by $d_1$, $d_2$, $d_3$, . . . .

The endoscope objective optical system here is made up of, in order from the object side, a first group G1 of positive refracting power, a second group G2 of negative refracting power and a third group G3 of positive refracting power. The first group G1 consists of, in order from the object side, a plano-concave negative lens, a positive cemented lens in which a positive meniscus lens convex on its image side and a negative meniscus lens convex on its image side are cemented together, and a positive cemented lens in which a double-convex positive lens and a negative meniscus lens convex on its image side are cemented together. The second group G2 consists of a negative cemented lens in which a double-concave negative lens and a positive meniscus lens convex on its object side are cemented together in order from the object side, and is allowed to move on the optical axis toward the image side for focusing from normal viewing to closest-range viewing. Between the first group G1 and the second group G2 there is an aperture stop S located that moves together with the second group G2 during focusing.

The third group G3 consists of, in order from its object side, a double-convex positive lens and a positive cemented lens in which a double-convex positive lens and a negative meniscus lens convex on its image side are cemented together. The first group G1 further includes a plane-parallel plate F1 located between the plano-concave negative lens and the object-side cemented lens. The plane-parallel plate F1 is specifically a filter capable of cutting off light such as YAG laser 1,060 nm, semiconductor laser 810 nm and infrared light. Near an image plane I of the endoscope objective optical system, there is an imaging device disposed that cooperates with the endoscope objective optical system to set up an imaging optical system. The imaging device has a cover glass CG applied to it for the purpose of protecting an imaging plane.

Constructed as described above, the imaging optical system here satisfies Conditions (1) to (8) minus Condition (3). By proper determination of the focal lengths of the first G1, the second G2 and the third group G3, the imaging optical system can be kept compact with no image deterioration. FIG. 9 is an aberration curve diagram for Example 1 upon (a) normal viewing, (b) transient and (c) closest-range viewing. The aberration curve diagram is shown with the amount (mm) of aberrations except distortion as abscissa, provided that "E–003" means "×10$^{-3}$". Distortion is shown with the amount (%) of aberration as abscissa, and "ω" and "IH" are indicative of an angle of view (°) and an image height (mm), respectively. Throughout the diagrams, the wavelength for the aberration curves is given in mm.

In addition, since the imaging device used here satisfies Condition (7) for an imaging device having an increasing number of pixels, high-definition images can be obtained at each object point.

Example 2

Figures 2A, 2B, 2C:
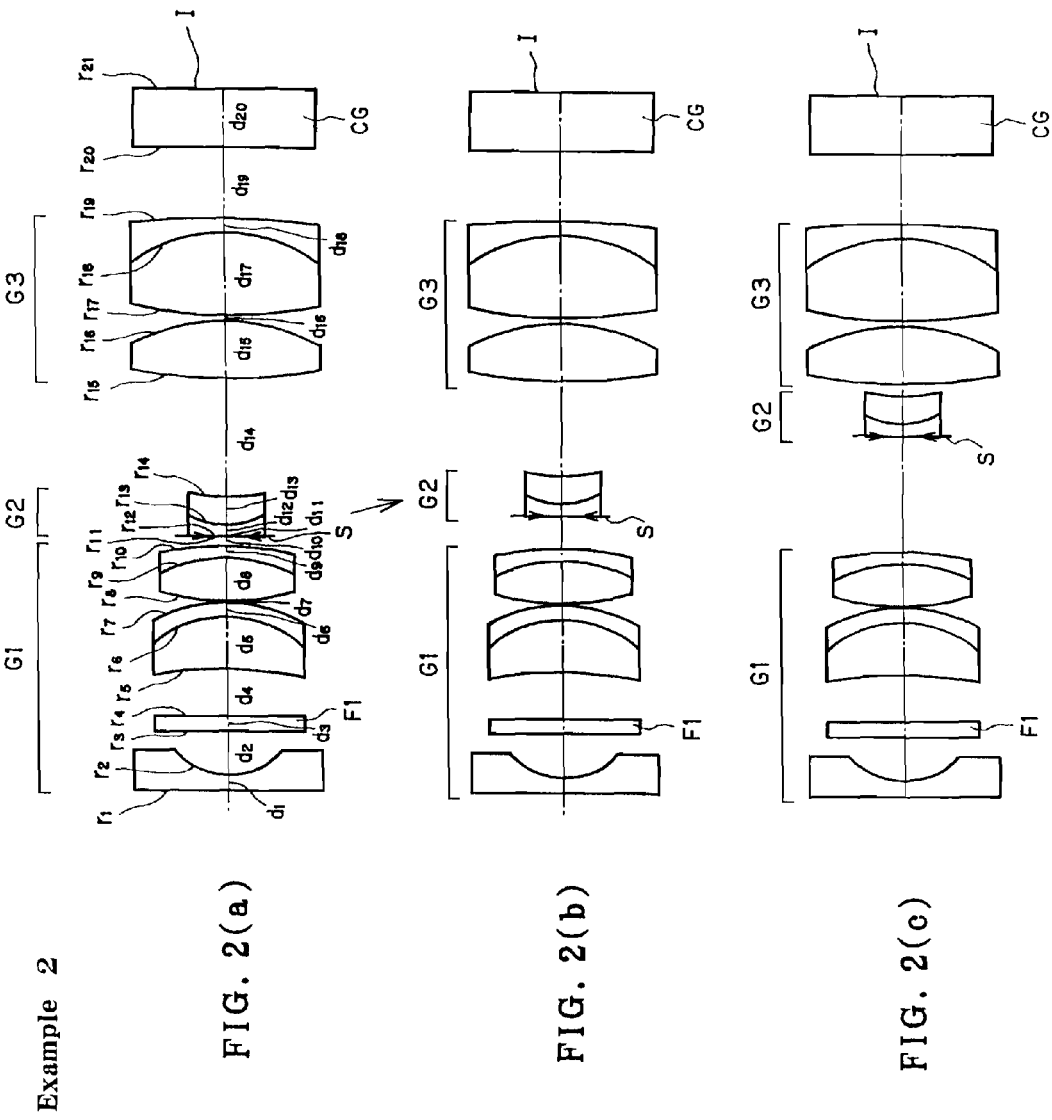
FIG. 2 is illustrative in section of the construction of the endoscope objective optical system according to Example 2.

FIG. 2 is illustrative in section through the optical axis of the construction of the endoscope objective optical system according to Example 2. Numerical data on the example here will be set out in Table 3, given later, and the values of variation parameters in three viewing states: (a) normal viewing, (b) transient and (c) closest viewing are tabulated in Table 4, given later.

The endoscope objective optical system here is made up of, in order from the object side, a first group G1 of positive refracting power, a second group G2 of negative refracting power and a third group G3 of positive refracting power. The first group G1 consists of, in order from the object side, a plano-concave negative lens, a positive cemented lens in which a positive meniscus lens convex on its image side and a negative meniscus lens convex on its image side are cemented together, and a positive cemented lens in which a double-convex positive lens and a negative meniscus lens convex on its image side are cemented together. The second group G2 consists of a negative cemented lens in which a negative meniscus lens convex on its object side and a positive meniscus lens convex on its object side are cemented together in order from the object side, and is allowed to move on the optical axis toward the image side for focusing from normal viewing to closest-range viewing. Between the first group G1 and the second group G2 there is an aperture stop S located that moves together with the second group G2 during focusing. The third group G3 consists of, in order from its object side, a double-convex positive lens and a positive cemented lens in which a double-convex positive lens and a negative meniscus lens convex on its image side are cemented together. The first group G1 further includes a plane-parallel plate F1 located between the plano-concave negative lens and the object-side cemented lens. The plane-parallel plate F1 is specifically a filter capable of cutting off light such as YAG laser 1,060 nm, semiconductor laser 810 nm and infrared light. Near an image plane I of the endoscope objective optical system, there is an imaging device disposed that cooperates with the endoscope objective optical system to set up an imaging optical system. The imaging device has a cover glass CG applied to it for the purpose of protecting an imaging plane.

Figure 10C:
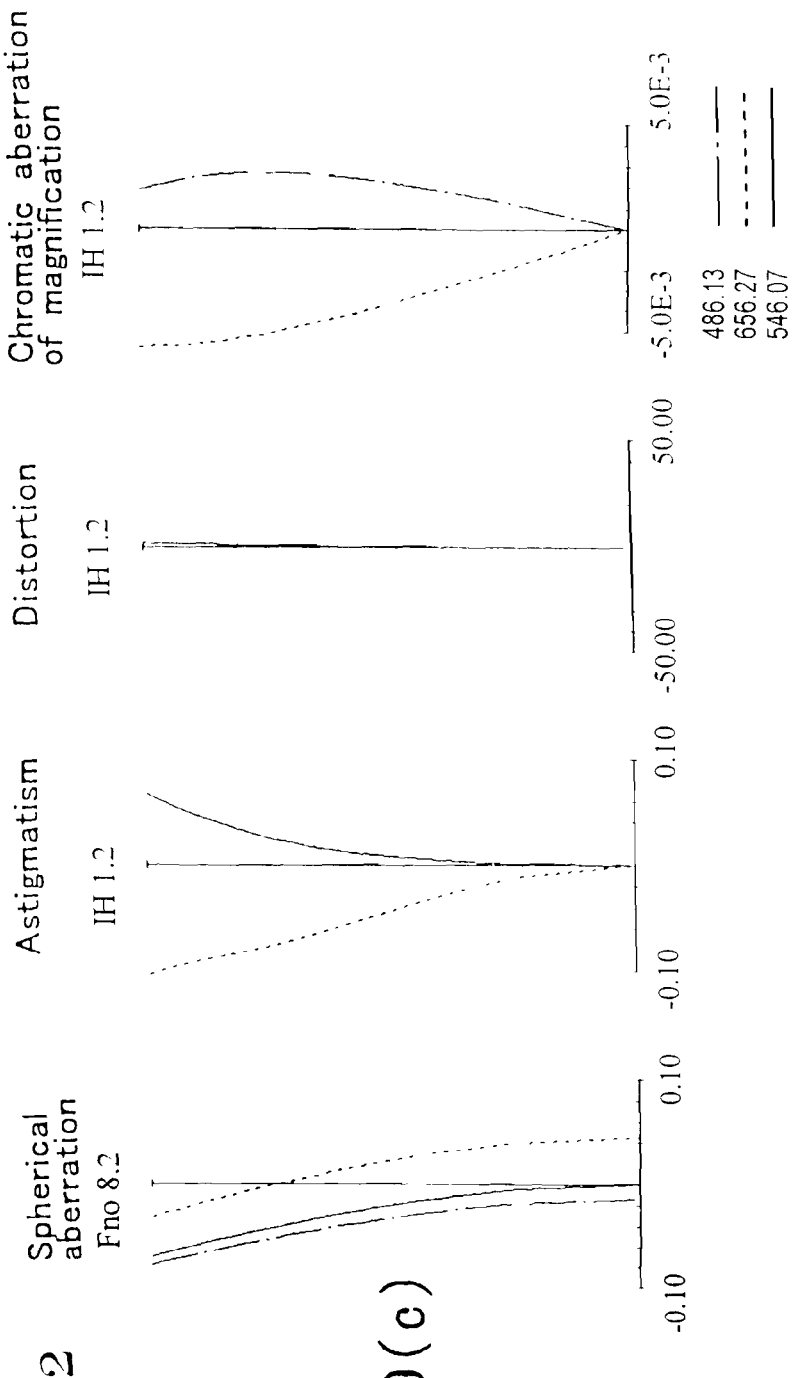
FIG. 10 is an aberration curve diagram for Example 2.

Constructed as described above, the imaging optical system here satisfies all Conditions (1) to (8). By proper determination of the focal lengths of the first G1, the second G2 and the third group G3, the imaging optical system can be kept compact with no image deterioration. FIG. 10 is an aberration curve diagram for Example 2 similar to FIG. 9.

In addition, since the imaging device used here satisfies Condition (7) for an imaging device having an increasing number of pixels, high-definition images can be obtained at each object point.

Example 3

Figure 3A:
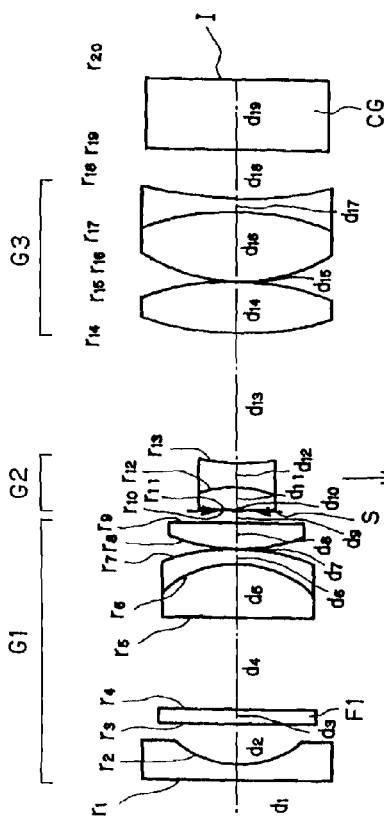
FIG. 3 is illustrative in section of the construction of the endoscope objective optical system according to Example 3.
Figure 3B:
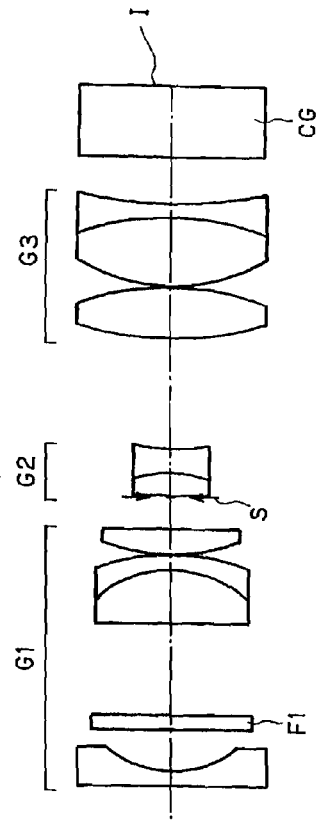
Figure 3C:
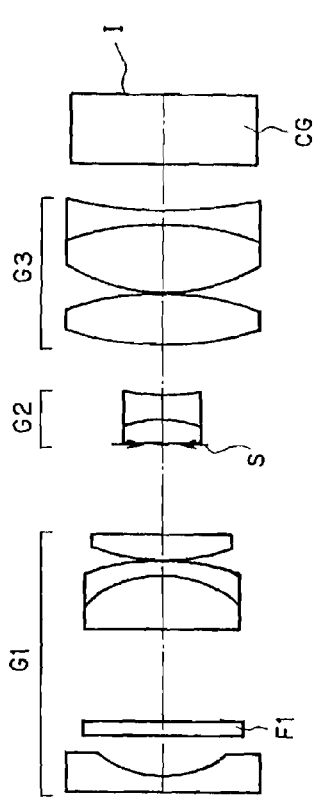

FIG. 3 is illustrative in section through the optical axis of the construction of the endoscope objective optical system according to Example 3. Numerical data on the example here will be set out in Table 5, given later, and the values of variation parameters in three viewing states: (a) normal viewing, (b) transient and (c) closest-range viewing are tabulated in Table 6, given later.

The endoscope objective optical system here is made up of, in order from the object side, a first group G1 of positive refracting power, a second group G2 of negative refracting power and a third group G3 of positive refracting power. The first group G1 consists of, in order from the object side, a plano-concave negative lens, a positive cemented lens in which a positive meniscus lens convex on its image side and a negative meniscus lens convex on its image side are cemented together, and a positive meniscus lens convex on its object side. The second group G2 consists of a negative cemented lens in which a positive meniscus lens convex on its image side and a double-concave negative lens are cemented together in order from the object side, and is allowed to move on the optical axis toward the image side for focusing from normal viewing to closest-range viewing. Between the first group G1 and the second group G2 there is an aperture stop S located that moves together with the second group G2 during focusing. The third group G3 consists of, in order from its object side, a double-convex positive lens and a positive cemented lens in which a double-convex positive lens and a double-concave negative lens are cemented together. The first group G1 further includes a plane-parallel plate F1 located between the plano-concave negative lens and the cemented lens. The plane-parallel plate F1 is specifically a filter capable of cutting off light such as YAG laser 1,060 nm, semiconductor laser 810 nm and infrared light. Near an image plane I of the endoscope objective optical system, there is an imaging device disposed that cooperates with the endoscope objective optical system to set up an imaging optical system. The imaging device has a cover glass CG applied to it for the purpose of protecting an imaging plane.

Figure 11A:
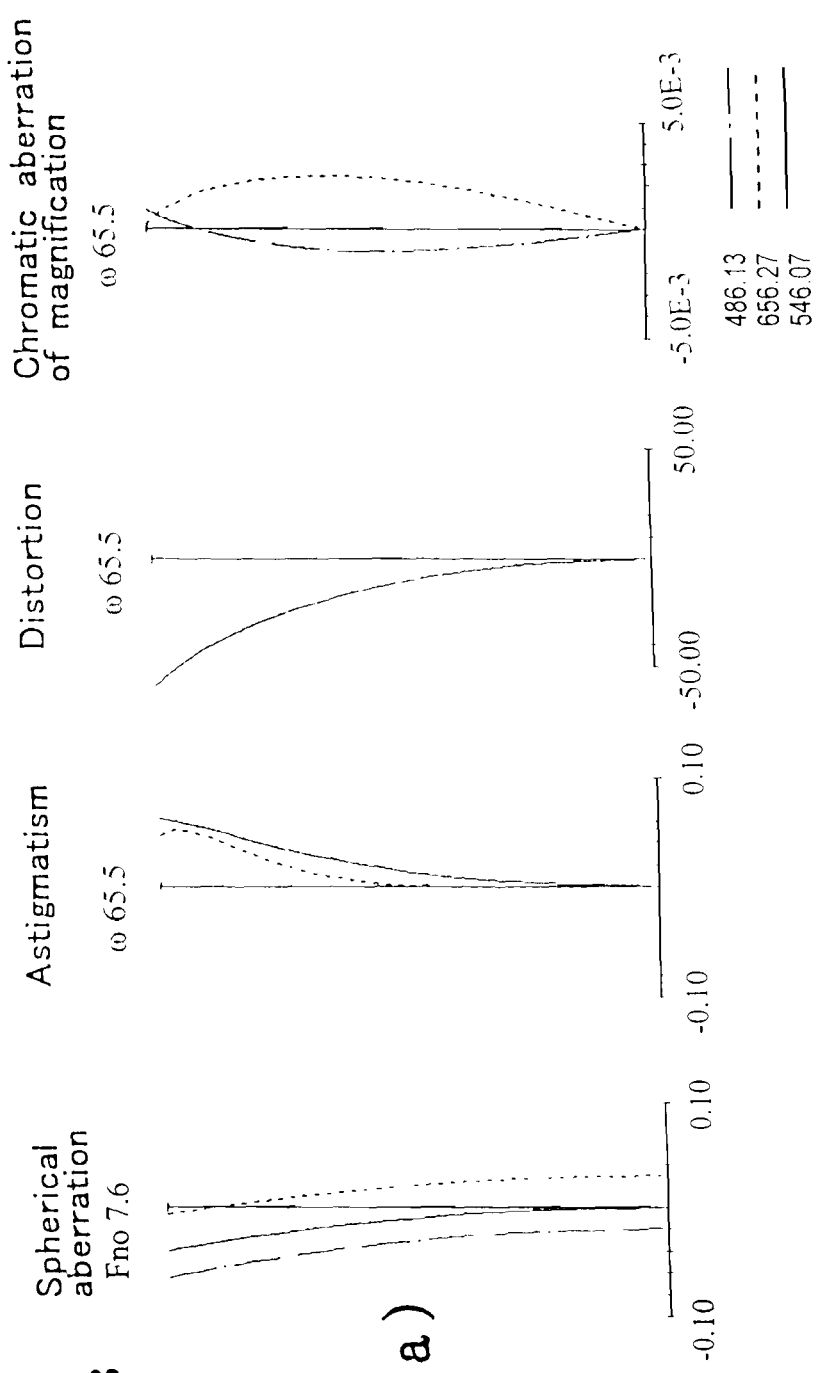
FIG. 11 is an aberration curve diagram for Example 3.
Figure 11B:
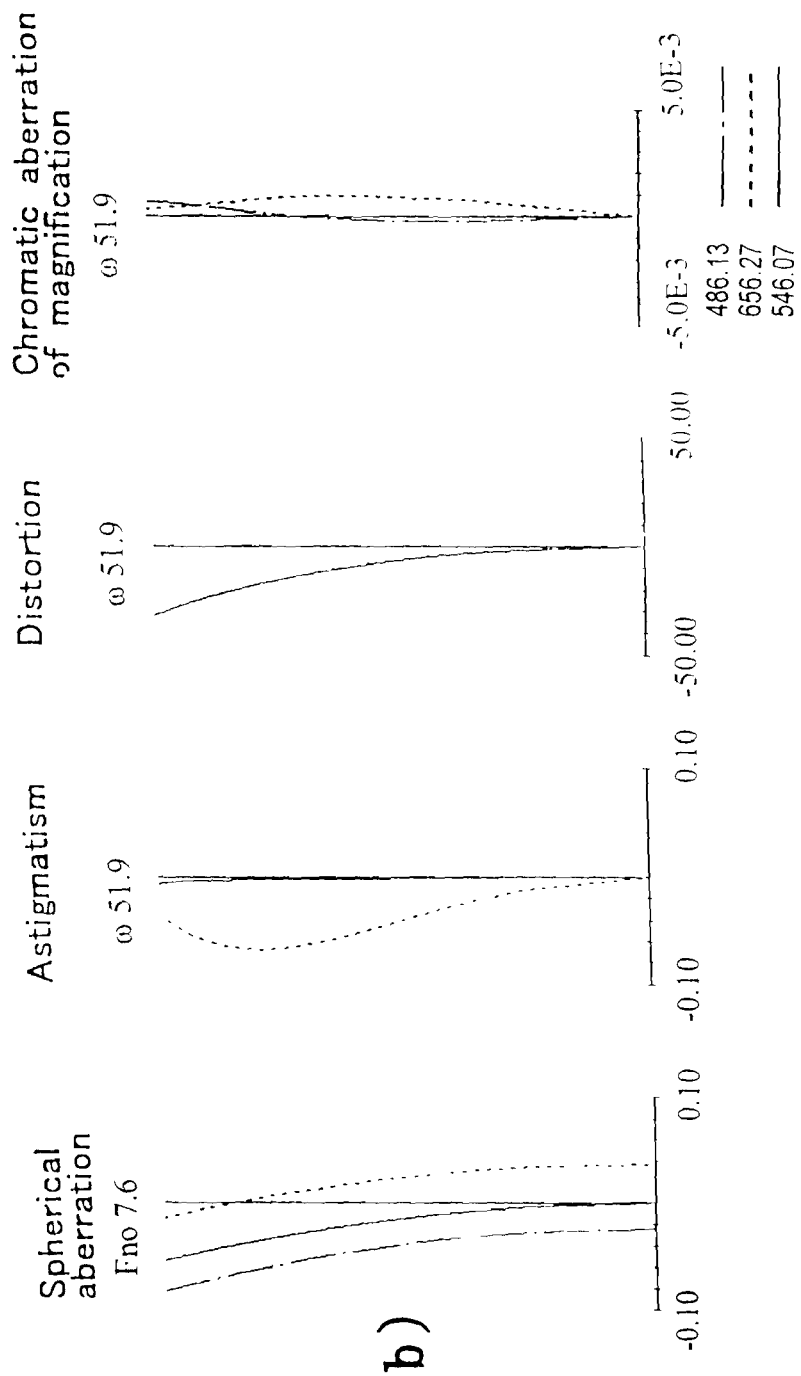
Figure 11C:
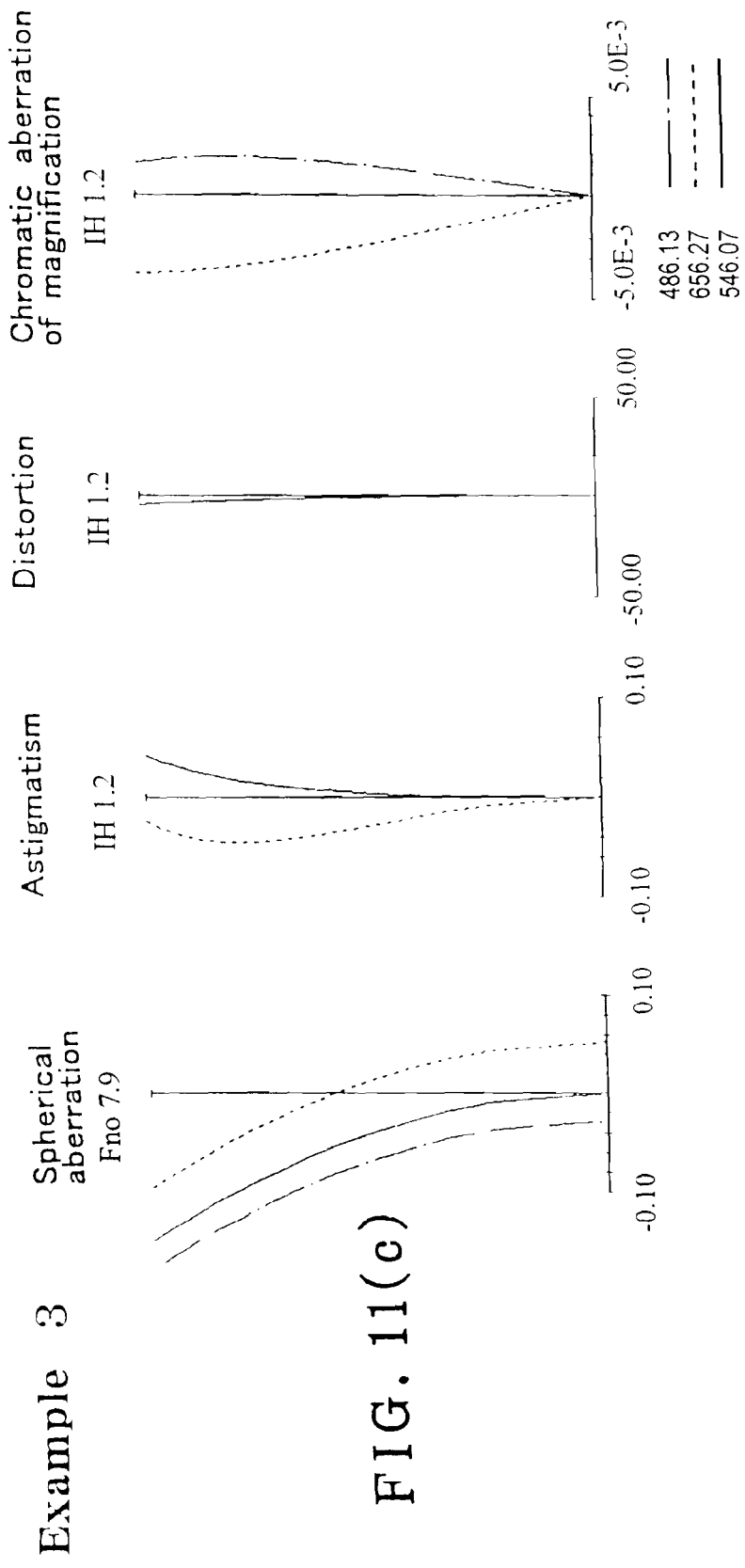

Constructed as described above, the imaging optical system here satisfies all Conditions (1) to (8) minus Condition (1). Although the maximum magnification is a bit lower for the reason that Condition (1) is not satisfied, yet this imaging optical system is going to be used with a CCD, CMOS or the like having a fine pixel pitch. In other words, by proper determination of the focal lengths of the first G1, the second G2 and the third group G3, the imaging optical system is well corrected for aberrations to be compatible with such an imaging device. For this reason, better image quality is obtained: even with the lower optical magnification made up for by electronic enlargement, there is no obstruction to viewing at all. It is thus possible to set up a compact imaging optical system with no image deterioration. FIG. 11 is an aberration curve diagram for Example 3 similar to FIG. 9.

In addition, since the imaging device used here satisfies Condition (7) for an imaging device having an increasing number of pixels, high-definition images can be obtained at each object point.

Example 4

Figure 4A:
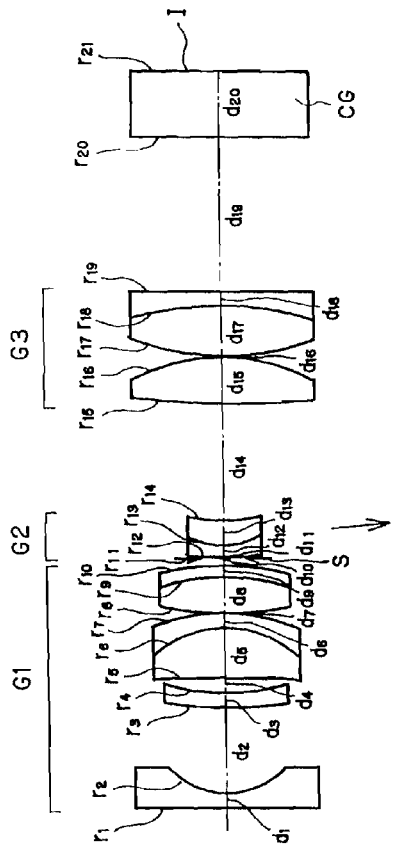
FIG. 4 is illustrative in section of the construction of the endoscope objective optical system according to Example 4.
Figure 4B:
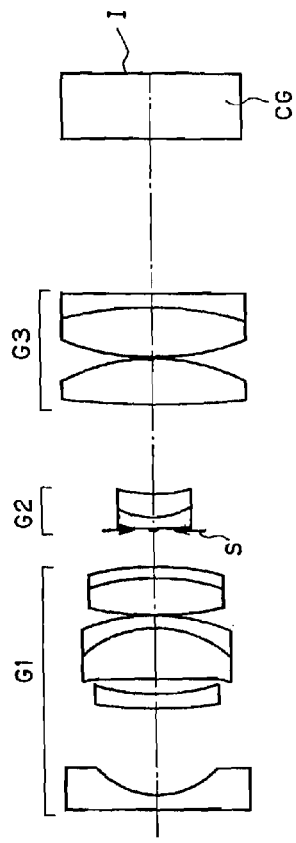
Figure 4C:
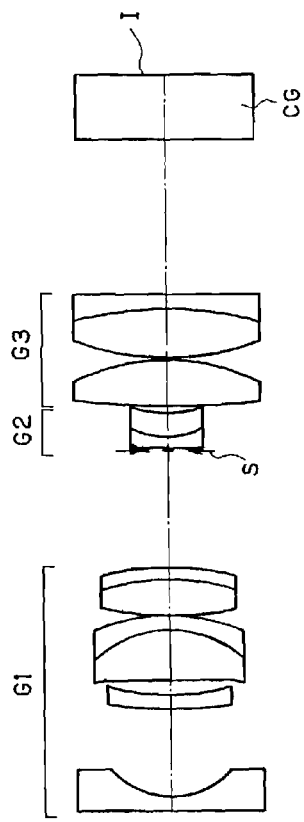

FIG. 4 is illustrative in section through the optical axis of the construction of the endoscope objective optical system according to Example 4. Numerical data on the example here will be set out in Table 7, given later, and the values of variation parameters in three viewing states: (a) normal viewing, (b) transient and (c) closest-range viewing are tabulated in Table 8, given later.

The endoscope objective optical system here is made up of, in order from the object side, a first group G1 of positive refracting power, a second group G2 of negative refracting power and a third group G3 of positive refracting power. The first group G1 consists of, in order from the object side, a plano-concave negative lens, a negative meniscus lens convex on its object side, a positive cemented lens in which a positive meniscus lens convex on its image side and a negative meniscus lens convex on its image side are cemented together, and a positive cemented lens in which a double-convex positive lens and a negative meniscus lens convex on its image side are cemented together. The second group G2 consists of a negative cemented lens in which a double-concave negative lens and a positive meniscus lens convex on its image side are cemented together in order from the object side, and is allowed to move on the optical axis toward the image side for focusing from normal viewing to closest-range viewing. Between the first group G1 and the second group G2 there is an aperture stop S located that moves together with the second group G2 during focusing. The third group G3 consists of, in order from the object side, a double-convex positive lens and a positive cemented lens in which a double-convex positive lens and a concave-plano negative lens are cemented together. In the first group G1, the negative meniscus lens that is a single lens is specifically a filter capable of cutting off light such as YAG laser 1,060 nm, semiconductor laser 810 nm and infrared light. Near an image plane I of the endoscope objective optical system, there is an imaging device disposed that cooperates with the endoscope objective optical system to set up an imaging optical system. The imaging device has a cover glass CG applied to it for the purpose of protecting an imaging plane.

Figure 12C:
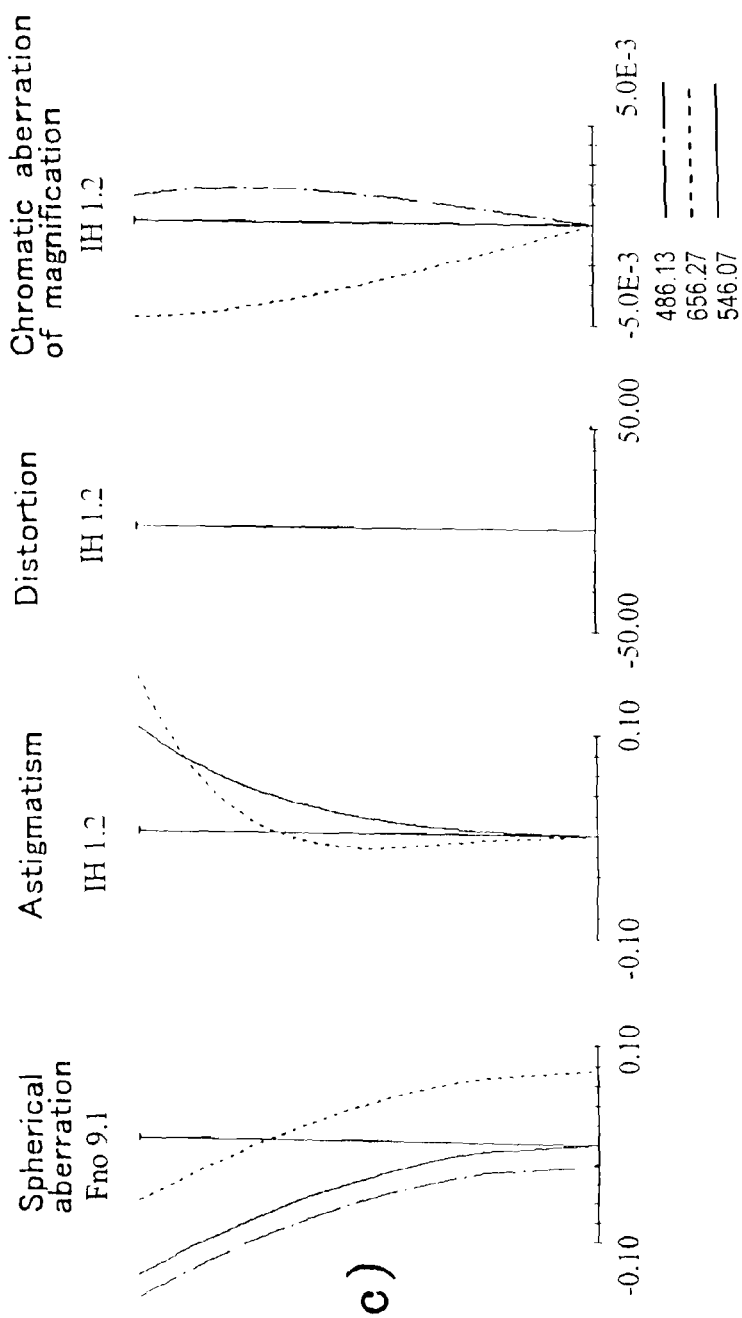
FIG. 12 is an aberration curve diagram for Example 4.

Constructed as described above, the imaging optical system here satisfies all Conditions (1) to (8). By proper determination of the focal lengths of the first G1, the second G2 and the third group G3, the imaging optical system can be kept compact with no image deterioration. FIG. 12 is an aberration curve diagram for Example 4 similar to FIG. 9.

In addition, since the imaging device used here satisfies Condition (7) for an imaging device having an increasing number of pixels, high-definition images can be obtained at each object point.

Example 5

Figure 5A:
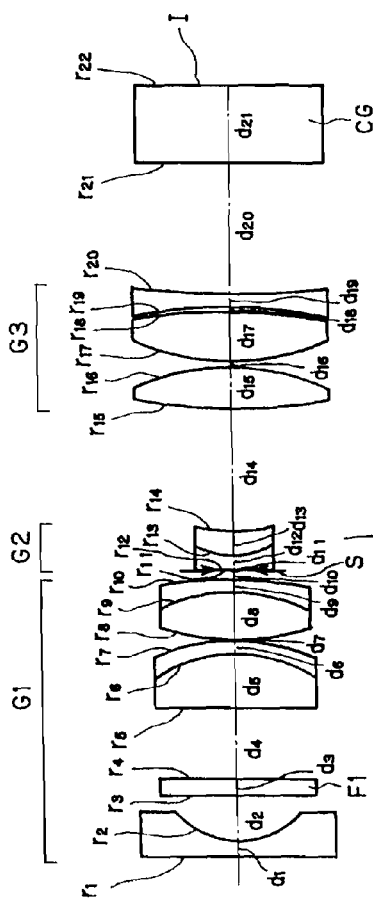
FIG. 5 is illustrative in section of the construction of the endoscope objective optical system according to Example 5.
Figure 5B:
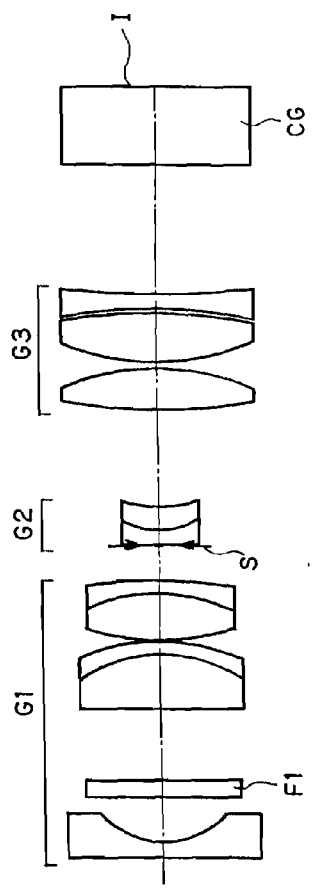
Figure 5C:
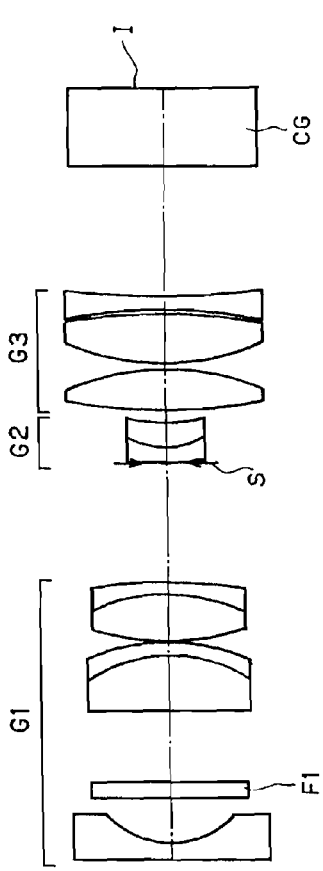

FIG. 5 is illustrative in section through the optical axis of the construction of the endoscope objective optical system according to Example 5. Numerical data on the example here will be set out in Table 9, given later, and the values of variation parameters in three viewing states: (a) normal viewing, (b) transient and (c) closest-range viewing are tabulated in Table 10, given later.

The endoscope objective optical system here is made up of, in order from the object side, a first group G1 of positive refracting power, a second group G2 of negative refracting power and a third group G3 of positive refracting power. The first group G1 consists of, in order from the object side, a plano-concave negative lens, a positive cemented lens in which a double-convex positive lens and a negative meniscus lens convex on its image side are cemented together, and a positive cemented lens in which a double-convex positive lens and a negative meniscus lens convex on its image side are cemented together. The second group G2 consists of a negative cemented lens in which a double-concave negative lens and a positive meniscus lens convex on its object side are cemented together in order from the object side, and is allowed to move on the optical axis toward the image side for focusing from normal viewing to closest-range viewing. Between the first group G1 and the second group G2 there is an aperture stop S located that moves together with the second group G2 during focusing. The third group G3 consists of, in order from the object side, a double-convex positive lens, a double-convex positive lens and a double-concave negative lens. The first group G1 further includes a plane-parallel plate F1 located between the plano-concave negative lens and the object-side cemented lens. The plane-parallel plate F1 is specifically a filter capable of cutting off light such as YAG laser 1,060 nm, semiconductor laser 810 nm and infrared light. Near an image plane I of the endoscope objective optical system, there is an imaging device disposed that cooperates with the endoscope objective optical system to set up an imaging optical system. The imaging device has a cover glass CG applied to it for the purpose of protecting an imaging plane.

Figure 13A:
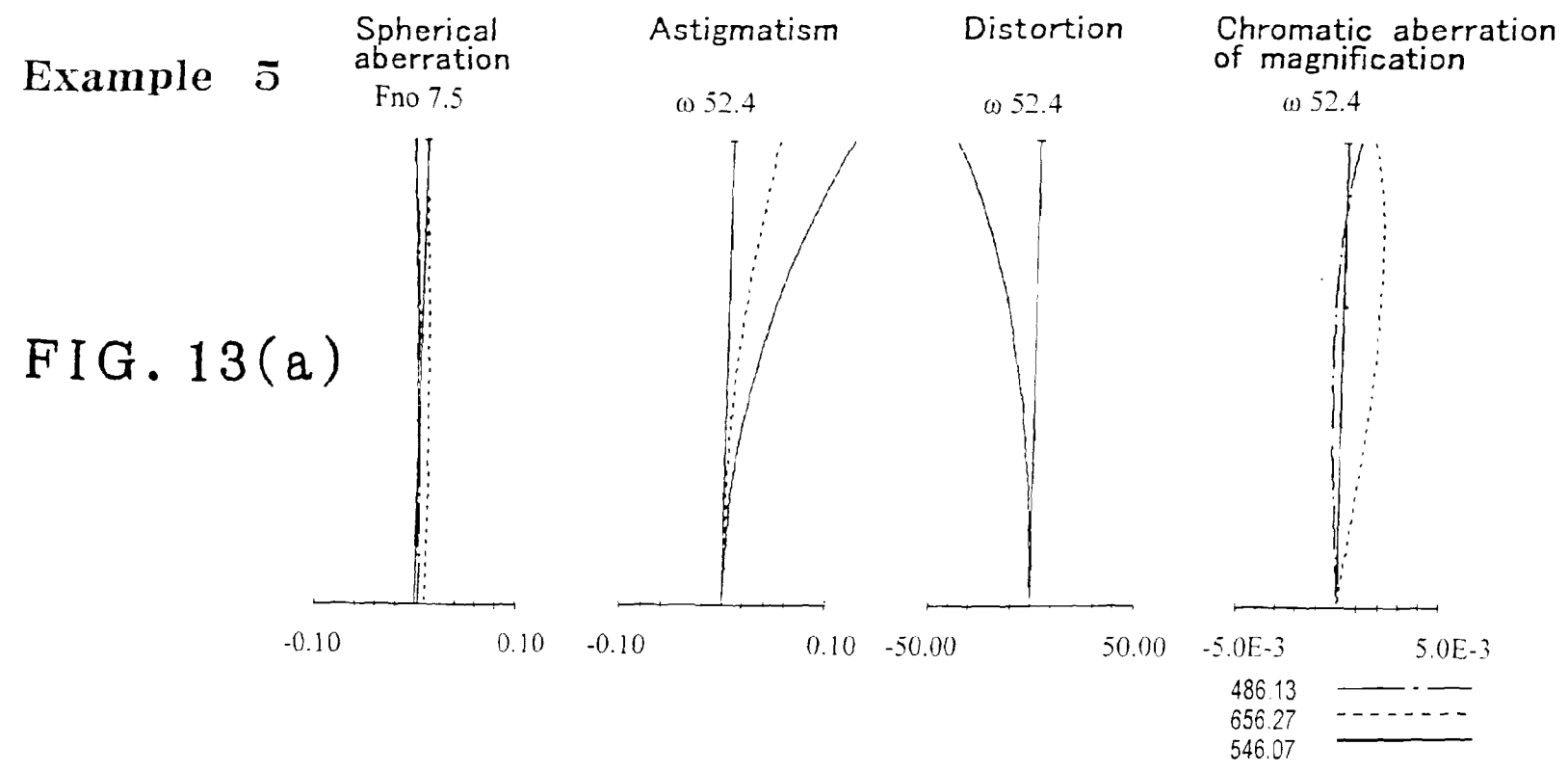
Figure 13C:
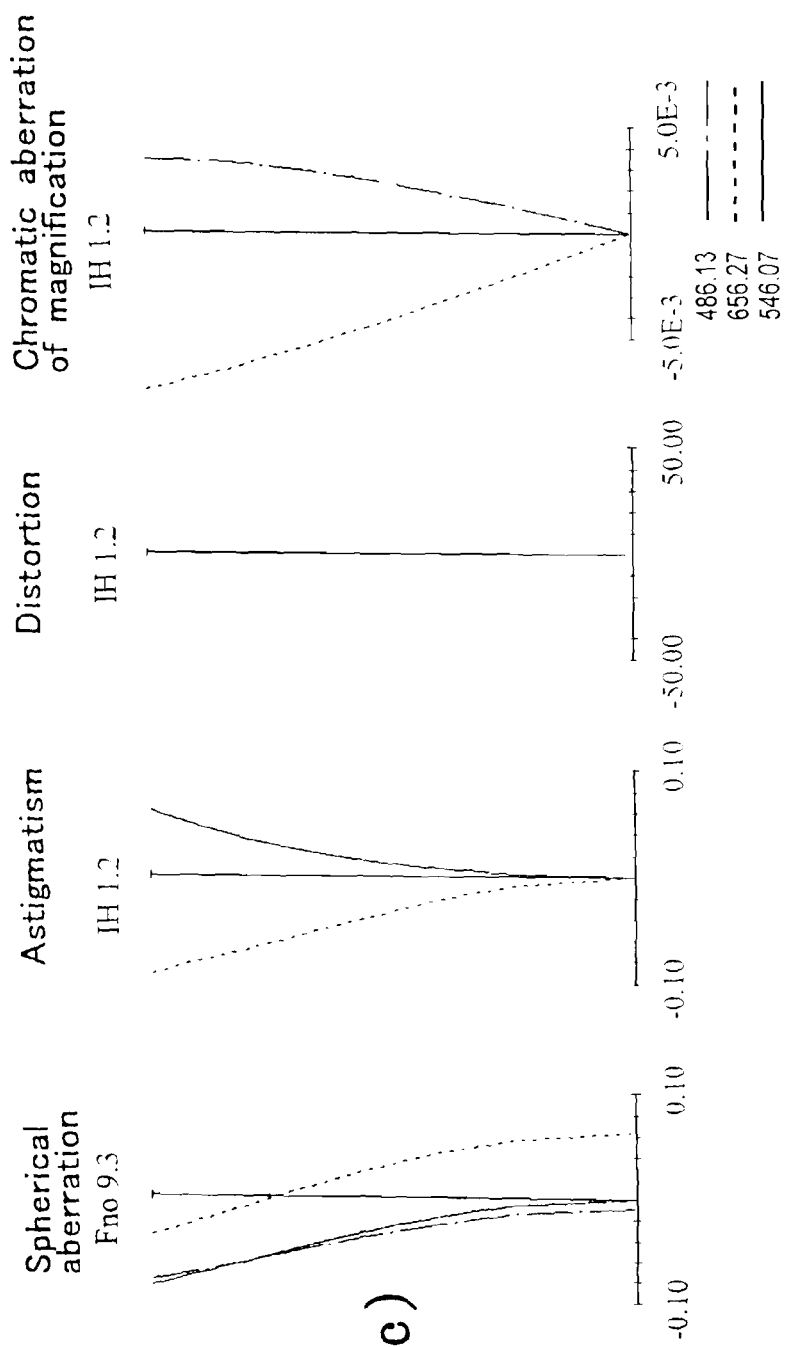
FIG. 13 is an aberration curve diagram for Example 5.

Constructed as described above, the imaging optical system here satisfies all Conditions (1) to (8). By proper determination of the focal lengths of the first G1, the second G2 and the third group G3, the imaging optical system can be kept compact with no image deterioration. FIG. 13 is an aberration curve diagram for Example 5 similar to FIG. 9.

In addition, since the imaging device used here satisfies Condition (7) for an imaging device having an increasing number of pixels, high-definition images can be obtained at each object point.

Example 6

Figure 6A:
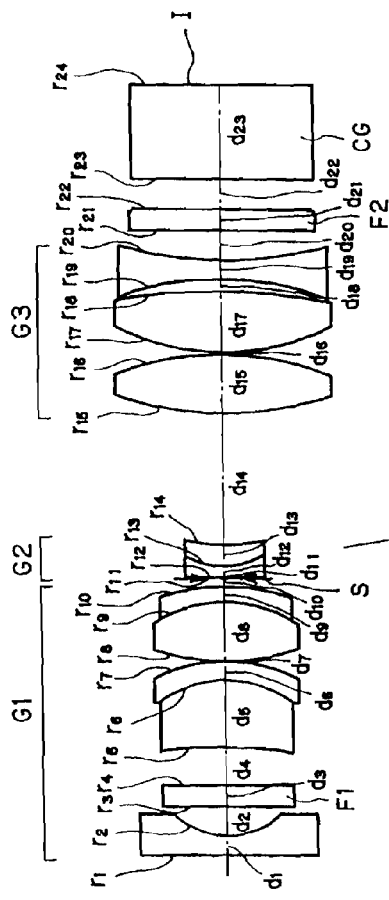
FIG. 6 is illustrative in section of the construction of the endoscope objective optical system according to Example 6.
Figure 6B:
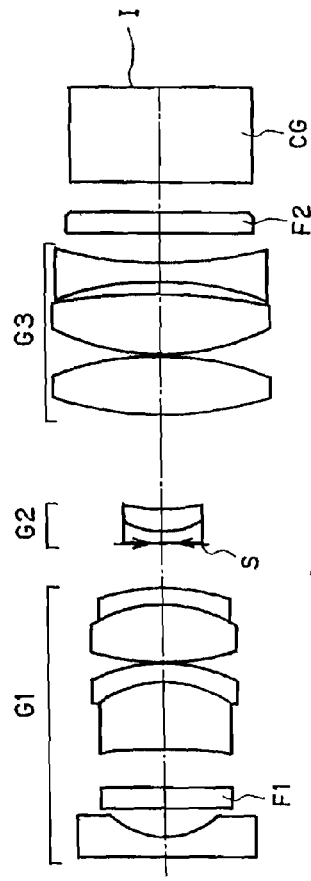
Figure 6C:
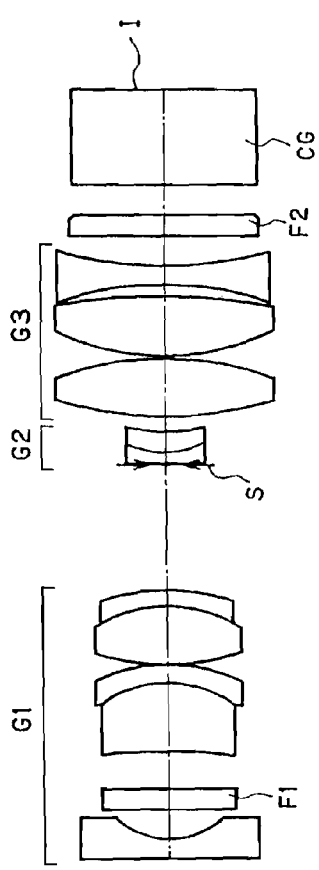

FIG. 6 is illustrative in section through the optical axis of the construction of the endoscope objective optical system according to Example 6. Numerical data on the example here will be set out in Table 11, given later, and the values of variation parameters in three viewing states: (a) normal viewing, (b) transient and (c) closest viewing are tabulated in Table 12, given later.

The endoscope objective optical system here is made up of, in order from the object side, a first group G1 of positive refracting power, a second group G2 of negative refracting power and a third group G3 of positive refracting power. The first group G1 consists of, in order from the object side, a plano-concave negative lens, a positive cemented lens in which a positive meniscus lens convex on its image side and a negative meniscus lens convex on its image side are cemented together, and a positive cemented lens in which a double-convex positive lens and a negative meniscus lens convex on its image side are cemented together. The second group G2 consists of a negative cemented lens in which a plano-concave negative lens and a positive meniscus lens convex on its object side are cemented together in order from the object side, and is allowed to move on the optical axis toward the image side for focusing from normal viewing to closest-range viewing. Between the first group G1 and the second group G2 there is an aperture stop S located that moves together with the second group G2 during focusing. The third group G3 consists of, in order from the object side, a double-convex positive lens, a double-convex positive lens and a double-concave negative lens. The first group G1 further includes a plane-parallel plate F1 located between the plano-concave negative lens and the object-side cemented lens, and the third group G3 further includes a plane-parallel plate F2 located on the image side. The plane-parallel plates F1 and F2 are each specifically a filter capable of cutting off light such as YAG laser 1,060 nm, semiconductor laser 810 nm and infrared light. Near an image plane I of the endoscope objective optical system, there is an imaging device disposed that cooperates with the endoscope objective optical system to set up an imaging optical system. The imaging device has a cover glass CG applied to it for the purpose of protecting an imaging plane.

Figure 14A:
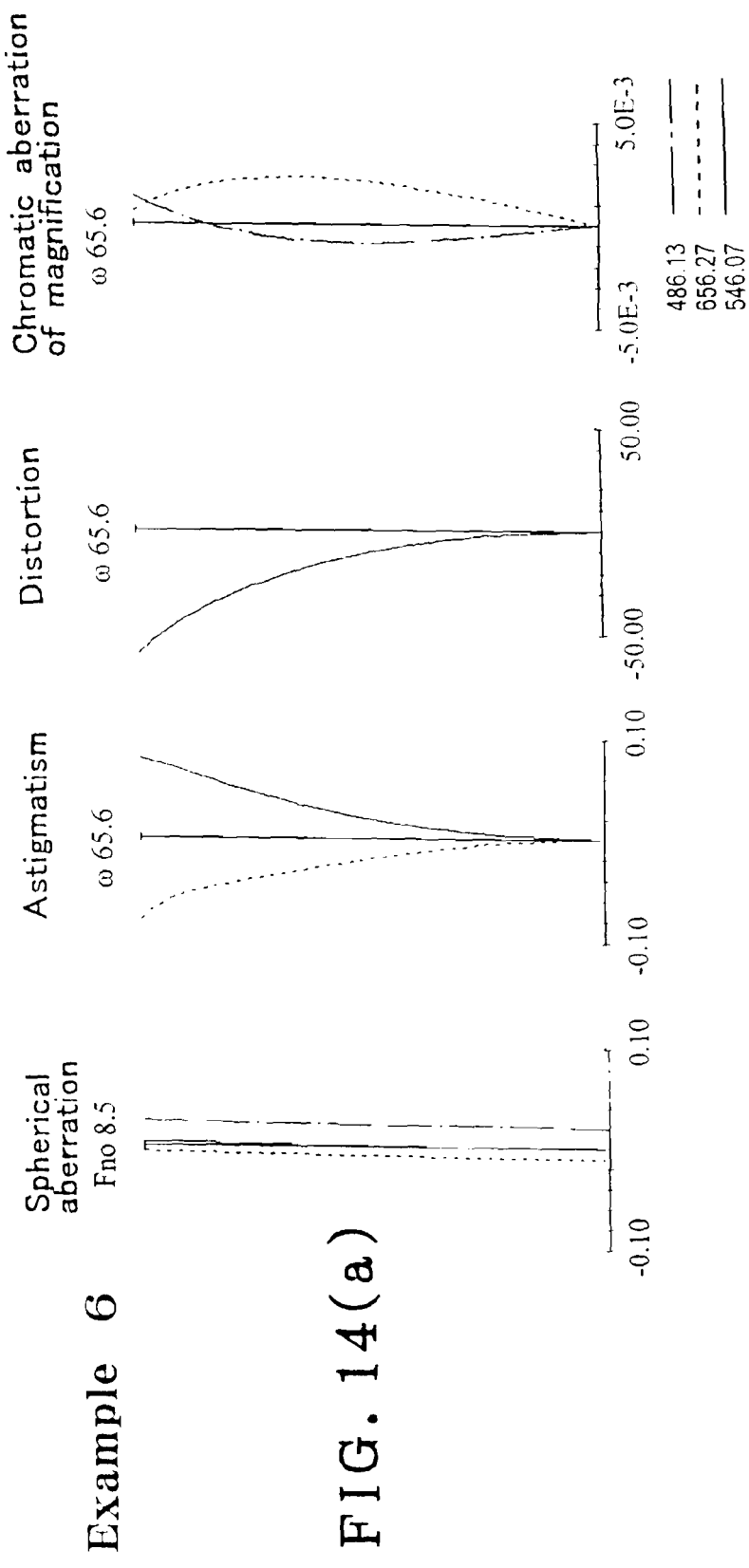
FIG. 14 is an aberration curve diagram for Example 6.
Figure 14B:
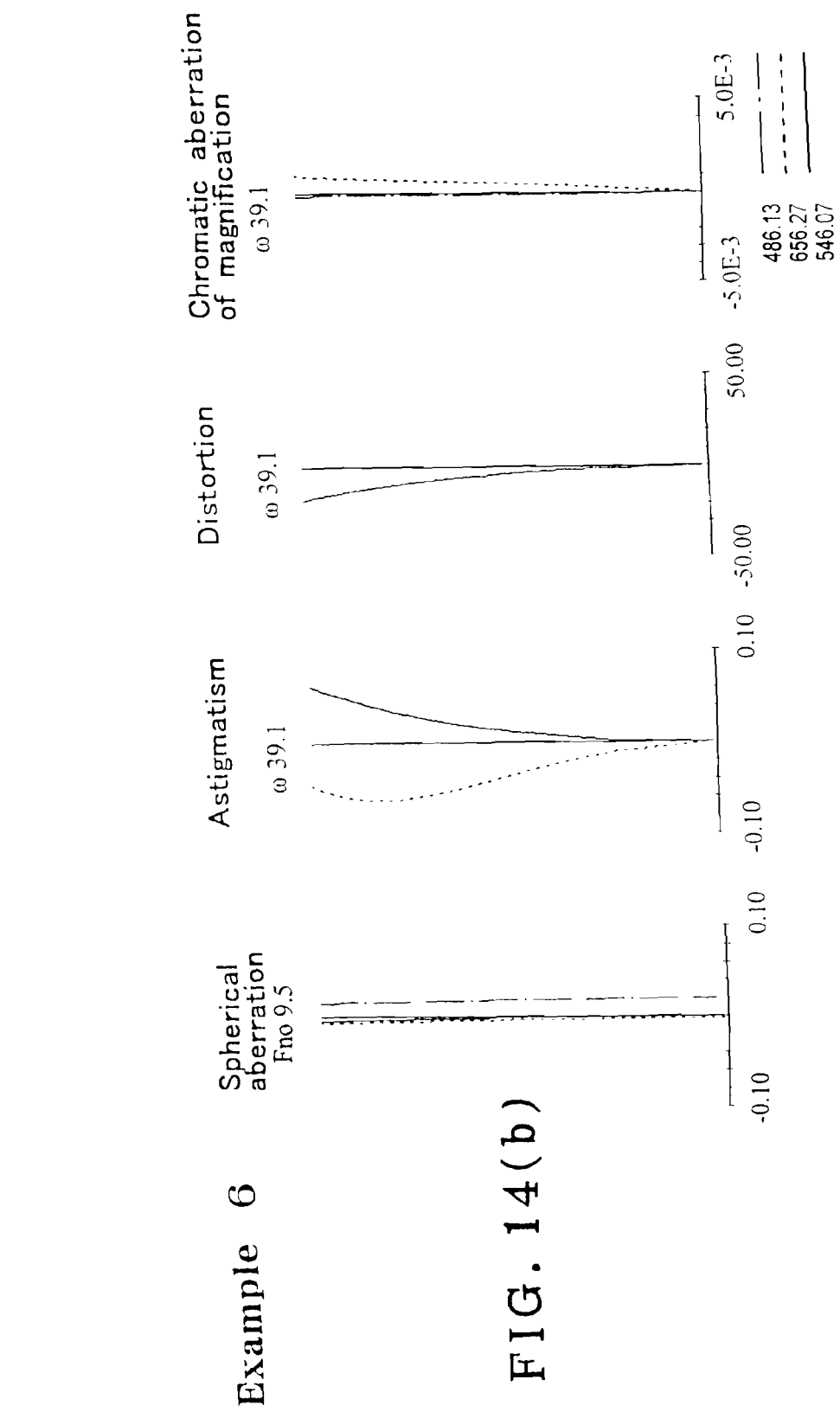
Figure 14C:
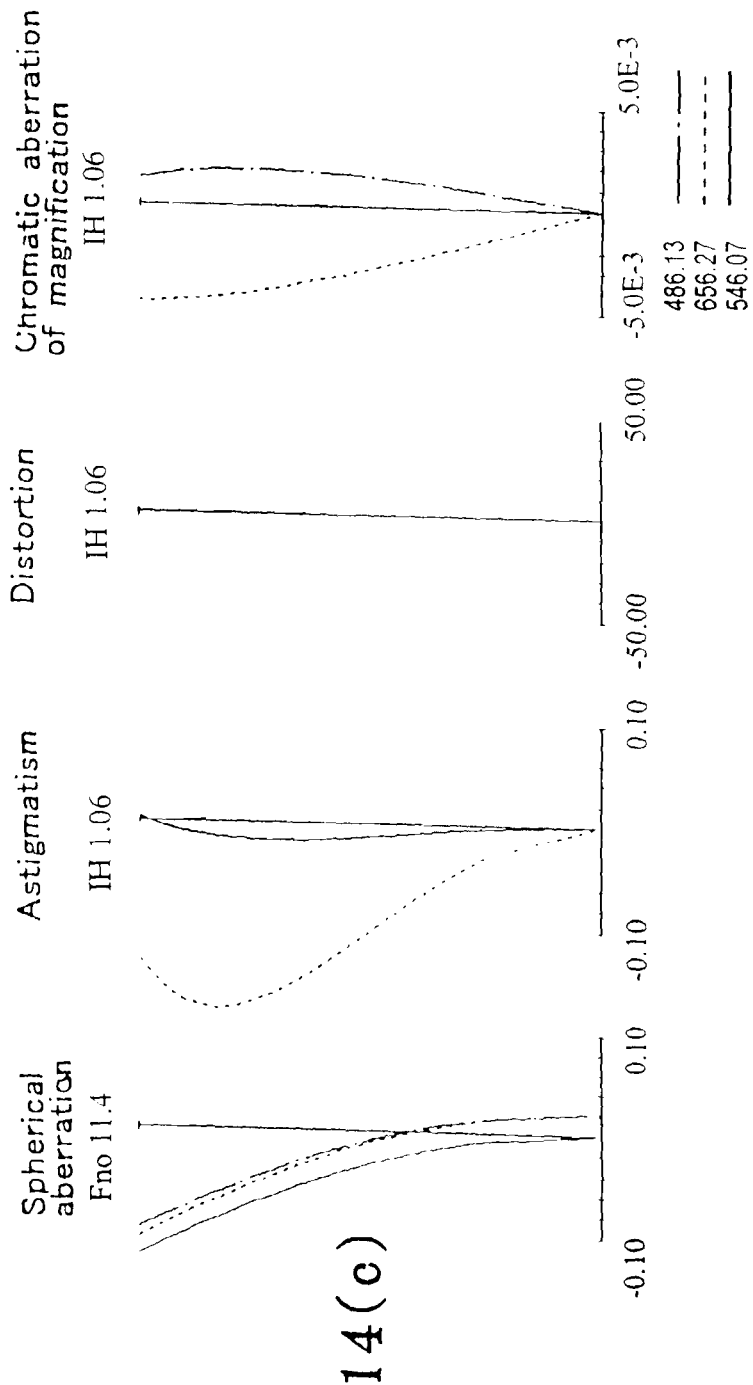

Constructed as described above, the imaging optical system here satisfies all Conditions (1) to (8). By proper determination of the focal lengths of the first G1, the second G2 and the third group G3, the imaging optical system can be kept compact with no image deterioration. FIG. 14 is an aberration curve diagram for Example 6 similar to FIG. 9.

In addition, since the imaging device used here satisfies Condition (7) for an imaging device having an increasing number of pixels, high-definition images can be obtained at each object point.

Example 7

Figures 7A, 7B, 7C:
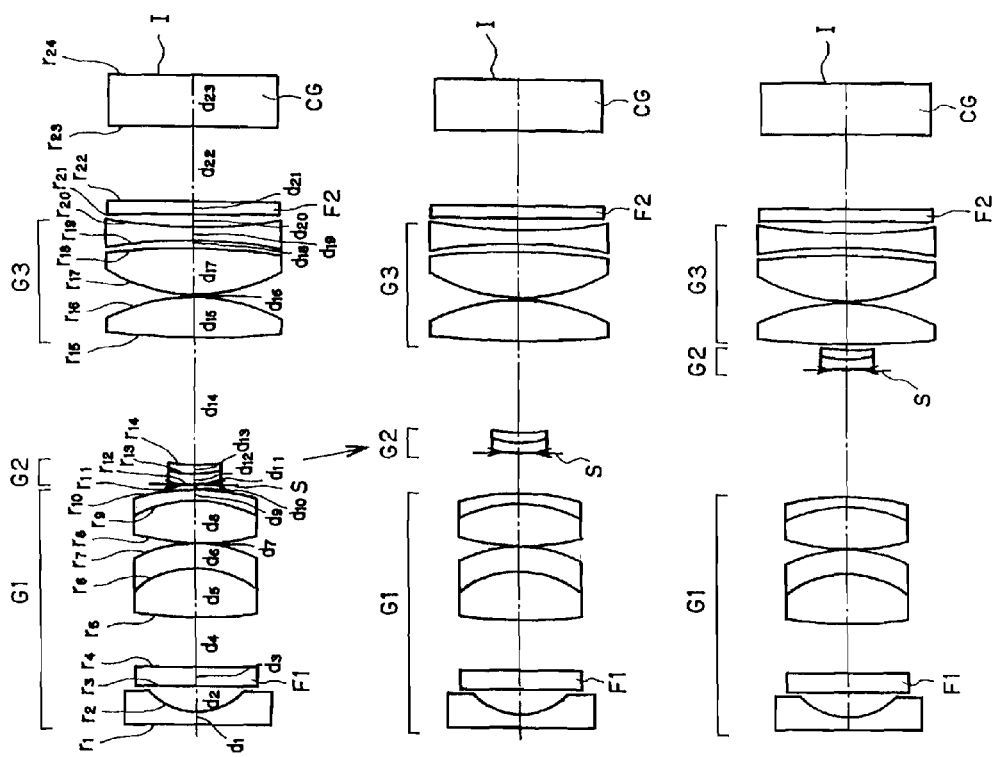
FIG. 7 is illustrative in section of the construction of the endoscope objective optical system according to Example 7.

FIG. 7 is illustrative in section through the optical axis of the construction of the endoscope objective optical system according to Example 7. Numerical data on the example here will be set out in Table 13, given later, and the values of variation parameters in three viewing states: (a) normal viewing, (b) transient and (c) closest viewing are tabulated in Table 14, given later.

The endoscope objective optical system here is made up of, in order from the object side, a first group G1 of positive refracting power, a second group G2 of negative refracting power and a third group G3 of positive refracting power. The first group G1 consists of, in order from the object side, a plano-concave negative lens, a positive cemented lens in which a double-convex positive lens and a negative meniscus lens convex on its image side are cemented together, and a positive cemented lens in which a double-convex positive lens and a negative meniscus lens convex on its image side are cemented together. The second group G2 consists of a negative cemented lens in which a negative meniscus lens convex on its object side and a positive meniscus lens convex on its object side are cemented together in order from the object side, and is allowed to move on the optical axis toward the image side for focusing from normal viewing to closest-range viewing. Between the first group G1 and the second group G2 there is an aperture stop S located that moves together with the second group G2 during focusing. The third group G3 consists of, in order from the object side, a double-convex positive lens, a double-convex positive lens and a double-concave negative lens. The first group G1 further includes a plane-parallel plate F1 located between the plano-concave negative lens and the object-side cemented lens, and the third group G3 further includes a plane-parallel plate F2 located on the image side. The plane-parallel plates F1 and F2 are each specifically a filter capable of cutting off light such as YAG laser 1,060 nm, semiconductor laser 810 nm and infrared light. Near an image plane I of the endoscope objective optical system, there is an imaging device disposed that cooperates with the endoscope objective optical system to set up an imaging optical system. The imaging device has a cover glass CG applied to it for the purpose of protecting an imaging plane.

Figure 15C:
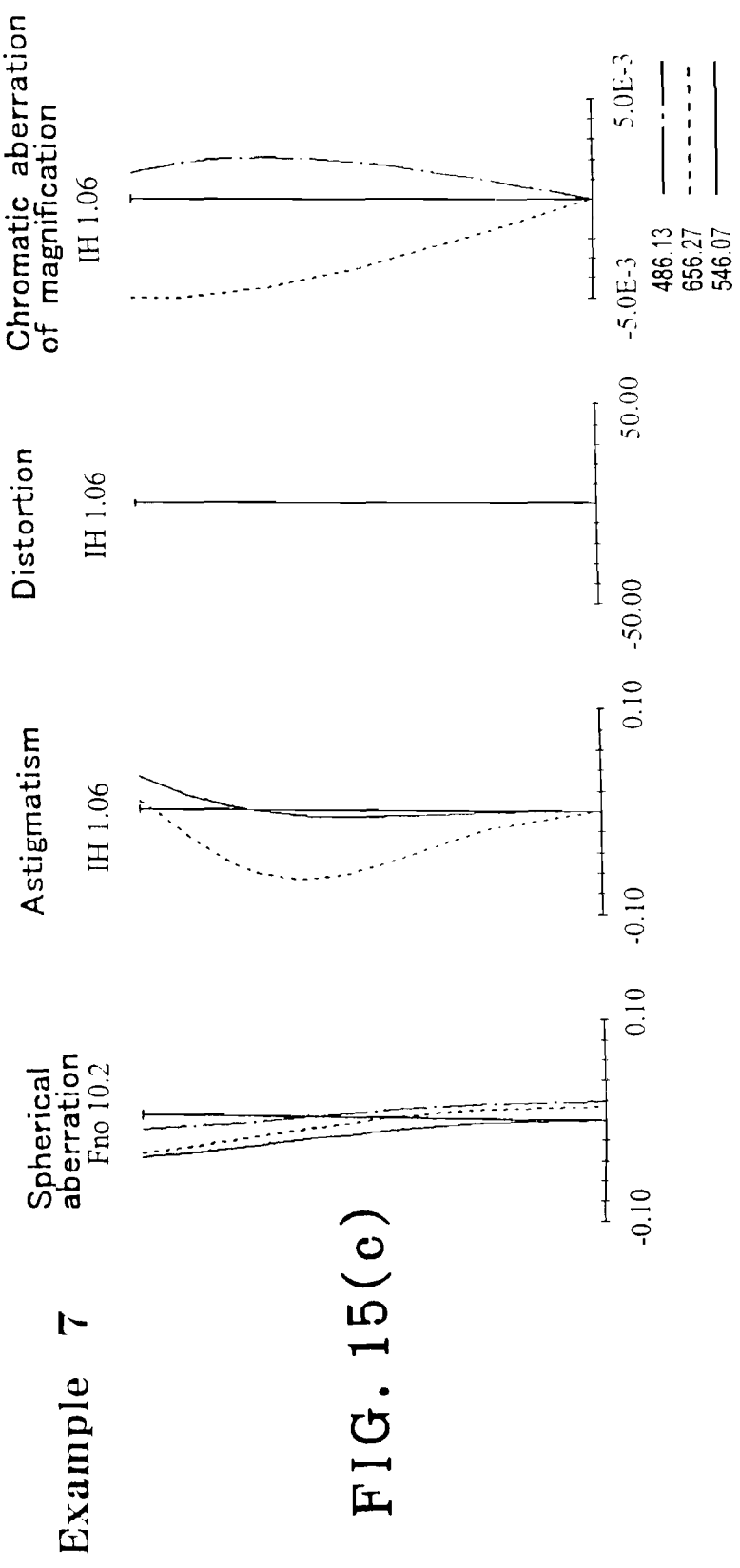
FIG. 15 is an aberration curve diagram for Example 7.

Constructed as described above, the imaging optical system here satisfies all Conditions (1) to (8). By proper determination of the focal lengths of the first G1, the second G2 and the third group G3, the imaging optical system can be kept compact with no image deterioration. FIG. 15 is an aberration curve diagram for Example 7 similar to FIG. 9.

In addition, since the imaging device used here satisfies Condition (7) for an imaging device having an increasing number of pixels, high-definition images can be obtained at each object point.

Example 8

Figure 8A:
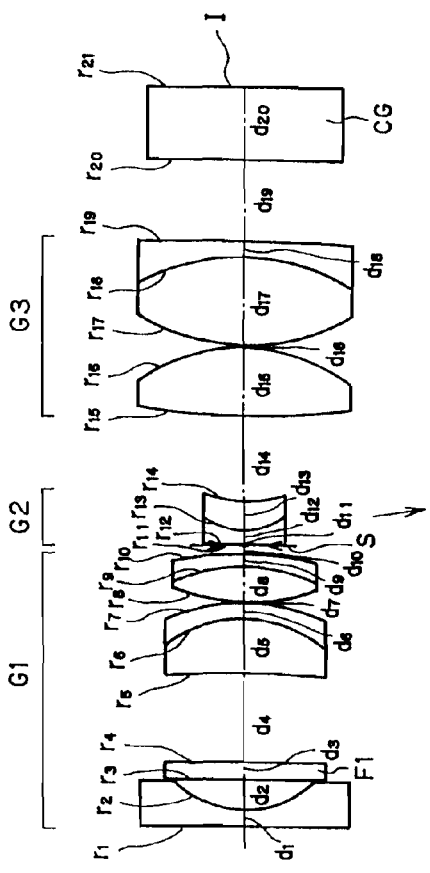
FIG. 8 is illustrative in section of the construction of the endoscope objective optical system according to Example 8.
Figure 8B:
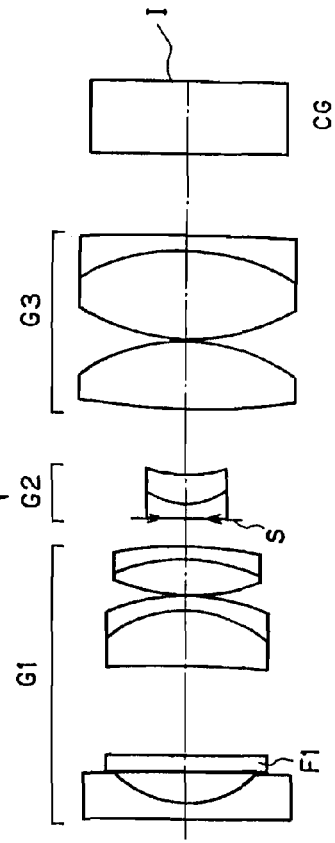
Figure 8C:
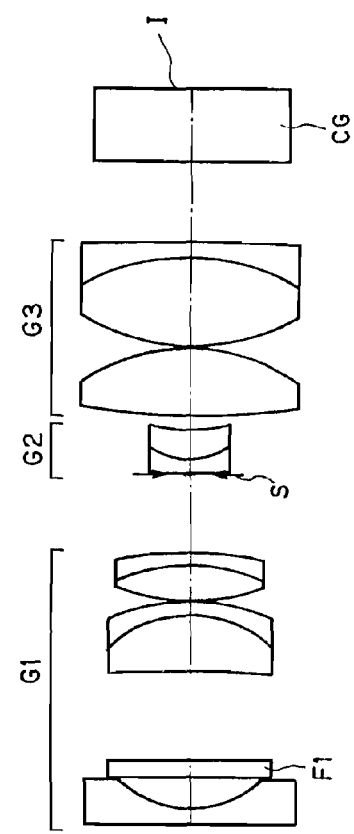

FIG. 8 is illustrative in section through the optical axis of the construction of the endoscope objective optical system according to Example 8. Numerical data on the example here will be set out in Table 15, given later, and the values of variation parameters in three viewing states: (a) normal viewing, (b) transient and (c) closest viewing are tabulated in Table 16, given later.

The endoscope objective optical system here is made up of, in order from the object side, a first group G1 of positive refracting power, a second group G2 of negative refracting power and a third group G3 of positive refracting power. The first group G1 consists of, in order from the object side, a plano-concave negative lens, a positive cemented lens in which a positive meniscus lens convex on its image side and a negative meniscus lens convex on its image side are cemented together, and a positive cemented lens in which a double-convex positive lens and a negative meniscus lens convex on its image side are cemented together. The second group G2 consists of a negative cemented lens in which a double-concave negative lens and a positive meniscus lens convex on its object side are cemented together in order from the object side, and is allowed to move on the optical axis toward the image side for focusing from normal viewing to closest-range viewing. Between the first group G1 and the second group G2 there is an aperture stop S located that moves together with the second group G2 during focusing. The third group G3 consists of, in order from the object side, a double-convex positive lens, and a positive cemented lens in which a double-convex positive lens and a negative meniscus lens convex on its image side are cemented together. The first group G1 further includes a plane-parallel plate F1 located between the plano-concave negative lens and the object-side cemented lens. The plane-parallel plate F1 is specifically a filter capable of cutting off light such as YAG laser 1,060 nm, semiconductor laser 810 nm and infrared light. Near an image plane I of the endoscope objective optical system, there is an imaging device disposed that cooperates with the endoscope objective optical system to set up an imaging optical system. The imaging device has a cover glass CG applied to it for the purpose of protecting an imaging plane.

Figure 16B:
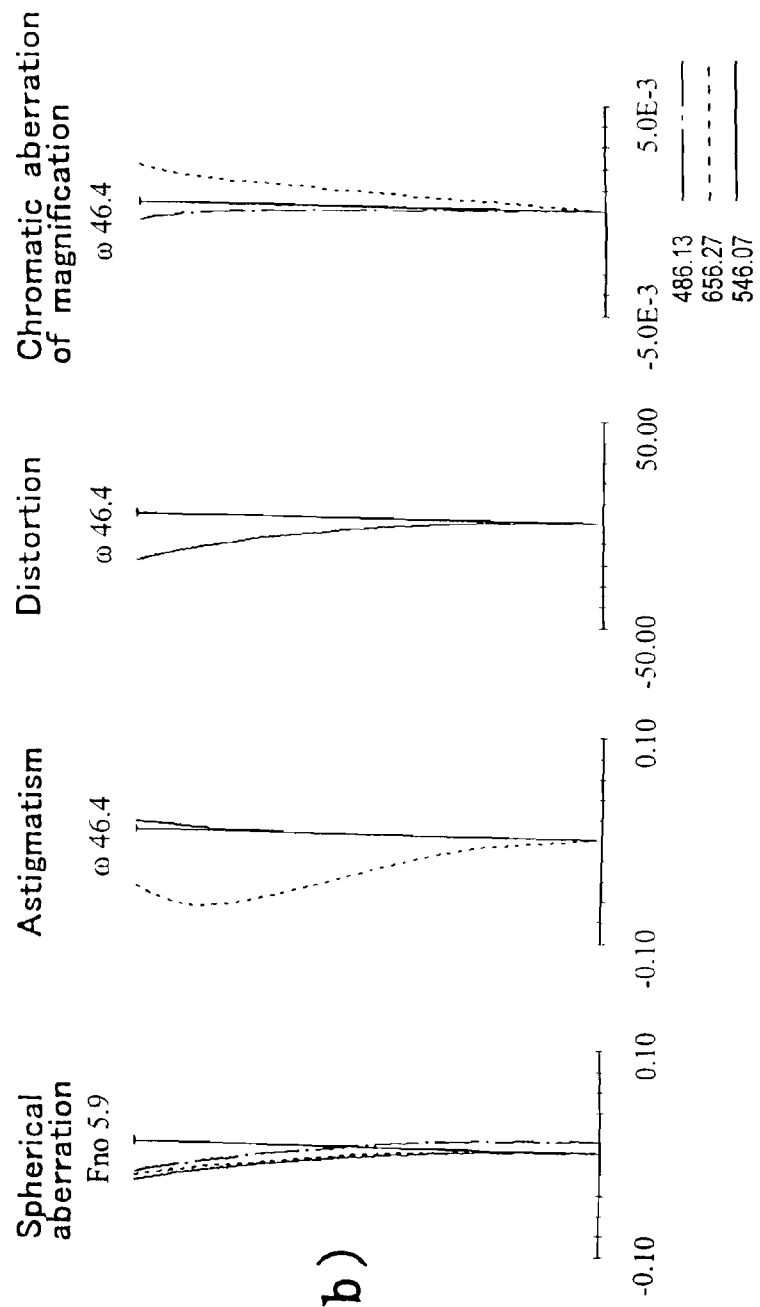
FIG. 16 is an aberration curve diagram for Example 8.

Constructed as described above, the imaging optical system here satisfies all Conditions (1) to (8). By proper determination of the focal lengths of the first G1, the second G2 and the third group G3, the imaging optical system can be kept compact with no image deterioration. FIG. 16 is an aberration curve diagram for Example 8 similar to FIG. 9.

In addition, since the imaging device used here satisfies Condition (7) for an imaging device having an increasing number of pixels, high-definition images can be obtained at each object point.

Set out in the following Tables 1 to 16 are the numerical data and parameters of Examples 1 to 8. Symbols used hereinafter but not hereinbefore have the following meanings: FD is a focal length, OD is an object point distance, FNo is an F-number, NP is normal viewing, MP is transient, and CP is closest-range viewing.

TABLE 1

(Example 1)

| No | r | d | ne | vd |
|---|---|---|---|---|
| 1 | ∞ | 0.3200 | 1.88814 | 40.78 |
| 2 | 1.3704 | 0.4520 | | |
| 3 | ∞ | 0.3100 | 1.51564 | 75.00 |
| 4 | ∞ | 1.8470 | | |
| 5 | −10.6402 | 1.0380 | 1.82017 | 46.62 |
| 6 | −1.5020 | 0.2800 | 1.93429 | 18.90 |
| 7 | −2.3221 | 0.0200 | | |
| 8 | 2.1477 | 0.7040 | 1.48915 | 70.23 |
| 9 | −2.2494 | 0.2400 | 1.85504 | 23.78 |
| 10 | −4.7343 | D10 | | |
| 11 (Stop) | ∞ | 0.0160 | | |
| 12 | −3.3558 | 0.2400 | 1.77621 | 49.60 |
| 13 | 0.6995 | 0.5500 | 1.85504 | 23.78 |
| 14 | 1.6703 | D14 | | |
| 15 | 7.2107 | 1.2280 | 1.48915 | 70.23 |
| 16 | −2.1635 | 0.0400 | | |
| 17 | 2.6506 | 1.5800 | 1.48915 | 70.23 |
| 18 | −2.3866 | 0.2800 | 1.93429 | 18.90 |
| 19 | −18.7551 | 1.9540 | | |
| 20 | ∞ | 1.2000 | 1.51825 | 64.14 |
| 21 (Image plane) | ∞ | | | |

TABLE 2

(Example 1)

| Parameter | NP | MP | CP |
|---|---|---|---|
| FD | 1.317 | 1.559 | 1.567 |
| FNo | 6.082 | 6.612 | 7.834 |
| OD | 12.50 | 1.88 | 0.00 |
| D10 | 0.168 | 0.533 | 1.400 |
| D14 | 1.504 | 1.139 | 0.272 |

IH: 1.2 mm
β: −2.00
P: 2.8 μm

TABLE 3

(Example 2)

| No | r | d | ne | vd |
|---|---|---|---|---|
| 1 | ∞ | 0.320 | 1.88814 | 40.78 |
| 2 | 0.9858 | 0.874 | | |
| 3 | ∞ | 0.310 | 1.51564 | 75.00 |
| 4 | ∞ | 0.941 | | |
| 5 | −4.8526 | 1.038 | 1.82017 | 46.62 |
| 6 | −1.5020 | 0.280 | 1.93429 | 18.90 |
| 7 | −1.9928 | 0.020 | | |
| 8 | 3.0108 | 0.860 | 1.48915 | 70.23 |
| 9 | −1.9465 | 0.240 | 1.85504 | 23.78 |
| 10 | −4.1423 | D10 | | |
| 11 (Stop) | ∞ | 0.016 | | |
| 12 | 20.2767 | 0.240 | 1.77621 | 49.60 |

TABLE 3-continued (Example 2)

| No | r | d | ne | vd |
|---|---|---|---|---|
| 13 | 0.9664 | 0.550 | 1.85504 | 23.78 |
| 14 | 1.8050 | D14 | | |
| 15 | 5.8416 | 1.158 | 1.48915 | 70.23 |
| 16 | −2.5464 | 0.110 | | |
| 17 | 6.1872 | 1.629 | 1.56606 | 60.67 |
| 18 | −2.0860 | 0.280 | 1.93429 | 18.90 |
| 19 | −12.0725 | 1.468 | | |
| 20 | ∞ | 1.220 | 1.51825 | 64.14 |
| 21 (Image plane) | ∞ | | | |

TABLE 4

(Example 2)

| Parameter | NP | MP | CP |
|---|---|---|---|
| FD | 1.298 | 1.429 | 1.363 |
| FNo | 7.541 | 7.689 | 8.201 |
| OD | 12.50 | 1.88 | 0.00 |
| D10 | 0.168 | 0.635 | 2.296 |
| D14 | 2.368 | 1.901 | 0.240 |

IH: 1.2 mm
β: −2.13
P: 3.2 μm

TABLE 5

(Example 3)

| No | r | d | ne | vd |
|---|---|---|---|---|
| 1 | ∞ | 0.320 | 1.88814 | 40.78 |
| 2 | 1.3317 | 0.800 | | |
| 3 | ∞ | 0.310 | 1.51564 | 75.00 |
| 4 | ∞ | 1.791 | | |
| 5 | −81.4733 | 1.038 | 1.82017 | 46.62 |
| 6 | −1.5020 | 0.280 | 1.93429 | 18.90 |
| 7 | −2.8526 | 0.020 | | |
| 8 | 2.4750 | 0.500 | 1.48915 | 70.23 |
| 9 | 127.6395 | D9 | | |
| 10 (Stop) | ∞ | 0.015 | | |
| 11 | −15.3349 | 0.448 | 1.85504 | 23.78 |
| 12 | −1.2758 | 0.475 | 1.77621 | 49.60 |
| 13 | 2.2060 | D13 | | |
| 14 | 4.0011 | 1.023 | 1.48915 | 70.23 |
| 15 | −3.5513 | 0.040 | | |
| 16 | 2.3078 | 1.382 | 1.48915 | 70.23 |
| 17 | −3.4525 | 0.280 | 1.93429 | 18.90 |
| 18 | 5.2124 | 0.967 | | |
| 19 | ∞ | 1.350 | 1.51825 | 64.14 |
| 20 (Image plane) | ∞ | | | |

TABLE 6

(Example 3)

| Parameter | NP | MP | CP |
|---|---|---|---|
| FD | 1.380 | 1.462 | 1.377 |
| FNo | 7.552 | 7.647 | 7.885 |
| OD | 12.50 | 2.00 | 0.00 |
| D9 | 0.245 | 0.648 | 1.835 |
| D13 | 2.602 | 2.199 | 1.012 |

IH: 1.2 mm
β: −1.65
P: 2.1 μm

TABLE 7

(Example 4)

| No | r | d | ne | vd |
|---|---|---|---|---|
| 1 | ∞ | 0.320 | 1.88814 | 40.78 |
| 2 | 1.1392 | 1.750 | | |
| 3 | 5.2800 | 0.310 | 1.51564 | 75.00 |
| 4 | 2.8470 | 0.295 | | |
| 5 | −22.1047 | 1.038 | 1.82017 | 46.62 |
| 6 | −1.5020 | 0.280 | 1.93429 | 18.90 |
| 7 | −2.4207 | 0.020 | | |
| 8 | 3.7480 | 0.730 | 1.48915 | 70.23 |
| 9 | −2.7666 | 0.240 | 1.85504 | 23.78 |
| 10 | −3.8129 | D10 | | |
| 11 (Stop) | ∞ | 0.020 | | |
| 12 | −22.7856 | 0.240 | 1.77621 | 49.60 |
| 13 | 0.9533 | 0.513 | 1.85504 | 23.78 |
| 14 | 1.8529 | D14 | | |
| 15 | 10.5496 | 0.932 | 1.48915 | 70.23 |
| 16 | −2.6945 | 0.040 | | |
| 17 | 3.3427 | 1.016 | 1.48915 | 70.23 |
| 18 | −4.2610 | 0.280 | 1.93429 | 18.90 |
| 19 | ∞ | 3.232 | | |
| 20 | ∞ | 1.350 | 1.51825 | 64.14 |
| 21 (Image plane) | ∞ | | | |

TABLE 8

(Example 4)

| Parameter | NP | MP | CP |
|---|---|---|---|
| FD | 1.348 | 1.617 | 1.565 |
| FNo | 6.797 | 7.378 | 9.143 |
| OD | 12.50 | 1.88 | 0.00 |
| D10 | 0.168 | 0.770 | 2.460 |
| D14 | 2.424 | 1.822 | 0.132 |

IH: 1.2 mm
β: −2.60
P: 3.2 μm

TABLE 9

(Example 5)

| No | r | d | ne | vd |
|---|---|---|---|---|
| 1 | ∞ | 0.320 | 1.88814 | 40.78 |
| 2 | 1.0920 | 0.874 | | |
| 3 | ∞ | 0.310 | 1.51564 | 75.00 |
| 4 | ∞ | 1.341 | | |
| 5 | 8193.6408 | 1.038 | 1.82017 | 46.62 |
| 6 | −1.9112 | 0.280 | 1.93429 | 18.90 |
| 7 | −2.4683 | 0.020 | | |
| 8 | 3.1410 | 0.926 | 1.48915 | 70.23 |
| 9 | −2.0897 | 0.240 | 1.85504 | 23.78 |
| 10 | −5.5191 | D10 | | |
| 11 (Stop) | ∞ | 0.015 | | |
| 12 | −21.0571 | 0.280 | 1.77621 | 49.60 |
| 13 | 0.9616 | 0.480 | 1.85504 | 23.78 |
| 14 | 1.7815 | D14 | | |
| 15 | 7.5218 | 0.802 | 1.48915 | 70.23 |
| 16 | −2.8584 | 0.111 | | |
| 17 | 2.9704 | 0.980 | 1.51825 | 64.14 |
| 18 | −7.1080 | 0.100 | | |
| 19 | −5.6050 | 0.280 | 1.93429 | 18.90 |
| 20 | 11.8650 | 2.522 | | |
| 21 | ∞ | 1.500 | 1.51825 | 64.14 |
| 22 (Image plane) | ∞ | | | |

TABLE 10

(Example 5)

| Parameter | NP | MP | CP |
|---|---|---|---|
| FD | 1.573 | 1.766 | 1.428 |
| FNo | 7.524 | 7.960 | 9.317 |
| OD | 12.50 | 1.88 | 0.00 |
| D10 | 0.168 | 0.676 | 2.288 |
| D14 | 2.374 | 1.866 | 0.254 |

IH: 1.2 mm
β: −2.81
P: 3.5 μm

TABLE 11

(Example 6)

| No | r | d | ne | vd |
|---|---|---|---|---|
| 1 | ∞ | 0.380 | 1.88814 | 40.78 |
| 2 | 0.9874 | 0.538 | | |
| 3 | ∞ | 0.420 | 1.51564 | 75.00 |
| 4 | ∞ | 0.725 | | |
| 5 | −6.1755 | 1.300 | 1.77621 | 49.60 |
| 6 | −1.3747 | 0.320 | 1.93429 | 18.90 |
| 7 | −2.0667 | 0.020 | | |
| 8 | 2.9281 | 1.080 | 1.48915 | 70.23 |
| 9 | −1.7301 | 0.300 | 2.01169 | 23.78 |
| 10 | −2.6722 | D10 | | |
| 11 (Stop) | ∞ | 0.016 | | |
| 12 | ∞ | 0.220 | 1.77621 | 49.60 |
| 13 | 0.9752 | 0.390 | 1.85504 | 23.78 |
| 14 | 1.5469 | D14 | | |
| 15 | 4.1576 | 1.143 | 1.48915 | 70.23 |
| 16 | −3.6602 | 0.046 | | |
| 17 | 2.9525 | 1.155 | 1.75844 | 52.32 |
| 18 | −7.1726 | 0.195 | | |
| 19 | −4.0923 | 0.360 | 1.93429 | 18.90 |
| 20 | 4.9202 | 0.570 | | |
| 21 | ∞ | 0.400 | 1.52498 | 59.89 |
| 22 | ∞ | 0.600 | | |
| 23 | ∞ | 1.800 | 1.51825 | 64.14 |
| 24 (Image plane) | ∞ | | | |

TABLE 12

(Example 6)

| Parameter | NP | MP | CP |
|---|---|---|---|
| FD | 1.242 | 1.520 | 1.226 |
| FNo | 8.517 | 9.456 | 11.436 |
| OD | 13.50 | 1.35 | 0.00 |
| D10 | 0.160 | 0.869 | 2.417 |
| D14 | 2.546 | 1.837 | 0.289 |

IH: 1.06 mm
β: −2.71
P: 4.2 μm

TABLE 13

(Example 7)

| No | r | d | ne | vd |
|---|---|---|---|---|
| 1 | ∞ | 0.280 | 1.88814 | 40.78 |
| 2 | 0.9473 | 0.500 | | |
| 3 | ∞ | 0.400 | 1.51564 | 75.00 |
| 4 | ∞ | 1.000 | | |
| 5 | 6.9425 | 1.000 | 1.59143 | 61.14 |
| 6 | −1.3398 | 0.520 | 1.93429 | 18.90 |
| 7 | −1.8321 | 0.015 | | |
| 8 | 3.0694 | 0.897 | 1.48915 | 70.23 |

TABLE 13-continued (Example 7)

| No | r | d | ne | vd |
|---|---|---|---|---|
| 9 | −1.6461 | 0.200 | 2.01169 | 28.27 |
| 10 | −3.2015 | D10 | | |
| 11 (Stop) | ∞ | 0.02 | | |
| 12 | 11.3687 | 0.176 | 1.77621 | 49.60 |
| 13 | 1.0145 | 0.200 | 1.85504 | 23.78 |
| 14 | 1.5239 | D14 | | |
| 15 | 11.4412 | 0.876 | 1.48915 | 70.23 |
| 16 | −2.4314 | 0.050 | | |
| 17 | 2.2561 | 1.000 | 1.49846 | 81.54 |
| 18 | −9.0813 | 0.170 | | |
| 19 | −5.5265 | 0.284 | 1.93429 | 18.90 |
| 20 | 6.8860 | 0.250 | | |
| 21 | ∞ | 0.270 | 1.52498 | 59.89 |
| 22 | ∞ | 1.526 | | |
| 23 | ∞ | 1.080 | 1.51825 | 64.14 |
| 24 (Image plane) | ∞ | | | |

TABLE 14

(Example 7)

| Parameter | NP | MP | CP |
|---|---|---|---|
| FD | 1.271 | 1.512 | 1.216 |
| FNo | 8.079 | 8.661 | 10.200 |
| OD | 13.50 | 1.28 | 0.00 |
| D10 | 0.128 | 0.853 | 2.587 |
| D14 | 2.587 | 1.862 | 0.128 |

IH: 1.06 mm
β: −2.79
P: 4.8 μm

TABLE 15

(Example 8)

| No | r | d | ne | vd |
|---|---|---|---|---|
| 1 | ∞ | 0.320 | 1.88814 | 40.78 |
| 2 | 1.3186 | 0.550 | | |
| 3 | ∞ | 0.310 | 1.51564 | 75.00 |
| 4 | ∞ | 1.656 | | |
| 5 | −13.4783 | 1.038 | 1.82017 | 46.62 |
| 6 | −1.5020 | 0.280 | 1.93429 | 18.90 |
| 7 | −2.3537 | 0.020 | | |
| 8 | 2.4400 | 0.659 | 1.48915 | 70.23 |
| 9 | −2.1307 | 0.240 | 1.85504 | 23.78 |
| 10 | −4.0769 | D10 | | |
| 11 (Stop) | ∞ | 0.016 | | |
| 12 | −6.1895 | 0.240 | 1.77621 | 49.60 |
| 13 | 0.7967 | 0.550 | 1.85504 | 23.78 |
| 14 | 1.5453 | D14 | | |
| 15 | 9.1245 | 1.276 | 1.48915 | 70.23 |
| 16 | −2.2055 | 0.040 | | |
| 17 | 2.5086 | 1.670 | 1.48915 | 70.23 |
| 18 | −2.6699 | 0.280 | 1.93429 | 18.90 |
| 19 | −167.6532 | 1.545 | | |
| 20 | ∞ | 1.350 | 1.51825 | 64.14 |
| 21 (Image plane) | ∞ | | | |

TABLE 16

(Example 8)

| Parameter | NP | MP | CP |
|---|---|---|---|
| FD | 1.321 | 1.520 | 1.492 |
| FNo | 5.515 | 5.892 | 6.834 |

TABLE 16-continued (Example 8)

| Parameter | NP | MP | CP |
|---|---|---|---|
| OD | 12.50 | 1.88 | 0.00 |
| D10 | 0.168 | 0.534 | 1.479 |
| D14 | 1.609 | 1.243 | 0.298 |

IH: 1.20 mm
β: −1.97
P: 2.8 μm

Set out in the following Table 17 are the values of Conditions (1) to (8) in the arrangements of the respective examples.

TABLE 17

| Condition | (1) | (2) | (3) | (4) | (5) | (6) | (7) | (8) |
|---|---|---|---|---|---|---|---|---|
| Example 1 | −2.00 | 0.75 | 1.53 | 0.39 | 0.59 | 0.09 | 1.17 | 64.1 |
| Example 2 | −2.13 | 0.92 | 2.49 | 0.35 | 0.86 | 0.15 | 1.25 | 64.6 |
| Example 3 | −1.65 | 0.88 | 2.37 | 0.36 | 0.85 | 0.11 | 1.06 | 65.5 |
| Example 4 | −2.60 | 0.92 | 1.97 | 0.36 | 0.71 | 0.15 | 1.03 | 65.6 |
| Example 5 | −2.81 | 0.77 | 1.91 | 0.35 | 0.67 | 0.14 | 1.04 | 52.4 |
| Example 6 | −2.71 | 0.93 | 1.86 | 0.40 | 0.74 | 0.15 | 1.46 | 65.6 |
| Example 7 | −2.79 | 0.94 | 2.08 | 0.38 | 0.79 | 0.18 | 1.62 | 65.1 |
| Example 8 | −1.97 | 0.78 | 1.64 | 0.39 | 0.64 | 0.09 | 1.19 | 65.3 |

The objective optical system of the invention, for instance, may be embodied as follows.

[1] An objective optical system, characterized by comprising, at least in order from an object side thereof, a positive, first group, a second group and a third group, wherein in association with an object point distance change, at least said second group is moved along an optical axis for focusing, with satisfaction of the following condition:

$$|\beta| > 1.8 \quad (1)$$

where β is an optical magnification upon focusing on the closest range.

[2] An objective optical system, characterized by comprising, in order from an object side thereof, a positive, first group, a negative, second group and a positive, third group, wherein in association with an object point distance change, said second group is moved along an optical axis for focusing, with satisfaction of the following condition:

$$|\beta| > 1.8 \quad (1)$$

where β is an optical magnification upon focusing on the closest range.

[3] An objective optical system, characterized by comprising, in order from an object side thereof, a positive, first group, a negative, second group and a positive, third group, wherein in association with an object point distance change, said second group is moved along an optical axis for focusing, with satisfaction of the following conditions (2) and (3):

$$0.7 < f_1/f < 1.0 \quad (2)$$

$$1.62 < f_2/f_1 < 2.75 \quad (3)$$

where f is the focal length of the whole system (upon focusing on a far point),
f$_1$ is the focal length of the first group, and
f$_2$ is the absolute value of the focal length of the second group.

[4] An objective optical system, characterized by comprising, in order from an object side thereof, a positive, first group, a negative, second group and a positive, third group, wherein in association with an object point distance change, said second group is moved together with a stop along an optical axis for focusing, with satisfaction of the following condition (4):

$$0.25 < f_1/f_3 < 0.45 \quad (4)$$

where $f_1$ is the focal length of the first group, and
$f_3$ is the focal length of the third group.

[5] An objective optical system as recited in any one of [1] to [4] above, characterized by being used with an endoscope.

[6] An objective optical system as recited in any one of [1], [2], [4] and [5] above, characterized by satisfying the following condition:

$$0.7 < f_1/f < 1.0 \quad (2)$$

where f is the focal length of the whole system (upon focusing on a far point), and
$f_1$ is the focal length of the first group.

[7] An objective optical system as recited in any one of [1] to [6] above, characterized by satisfying the following condition:

$$0.7 < f_1/f < 0.95 \quad (2')$$

where f is the focal length of the whole system (upon focusing on a far point), and
$f_1$ is the focal length of the first group.

[8] An objective optical system as recited in any one of [1], [2], [4], [5], [6] and [7] above, characterized by satisfying following condition:

$$1.62 < f_2/f_1 < 2.75 \quad (3)$$

where $f_1$ is the focal length of the first group, and
$f_2$ is the absolute value of the focal length of the second group.

[9] An objective optical system as recited in any one of [1], [2], [3], [5], [6], [7] and [8] above, characterized by satisfying the following condition:

$$0.25 < f_1/f_3 < 0.45 \quad (4)$$

where $f_1$ is the focal length of the first group, and
$f_3$ is the focal length of the third group.

[10] An objective optical system as recited in any one of [1] to [9] above, characterized by satisfying the following condition:

$$0.5 < f_2/f_3 < 1.0 \quad (5)$$

where $f_2$ is the absolute value of the focal length of the second group, and
$f_3$ is the focal length of the third group.

[11] An objective optical system as recited in [10] above, characterized by satisfying the following condition:

$$0.57 < f_2/f_3 < 0.90 \quad (5')$$

[12] An objective optical system as recited in any one of [1] to [11], characterized by satisfying the following condition:

$$0.07 < \Delta_{2G}/LTL < 0.21 \quad (6)$$

where $\Delta_{2G}$ is the amount of movement of the second group upon focusing from a far point to the closest range, and
LTL is the total lens length (the distance from the first surface to the imaging plane).

[13] An objective optical system as recited in any one of [1] to [12], characterized by satisfying the following condition:

$$0.5 < (P/|\beta|)/IH < 2.0 \quad (7)$$

where P is the pixel pitch in μm of the imaging device located on the image plane,
$\beta$ is an optical magnification upon focusing on the closest range, and
IH is the maximum image height in mm at the imaging device located on the image plane.

[14] An objective optical system as recited in any one of [1] to [13] above, characterized by satisfying the following condition:

$$\omega > 50° \quad (8)$$

where $\omega$ is the maximum angle of view upon focusing on a far point.

[15] An objective optical system as recited in any one of [1] to [3], and [5] to [14] above, characterized in that the stop moves together with said second group.

I claim:

1. An objective optical system, characterized by comprising, in order from an object side thereof, a first lens group of positive refractive power, a second lens group of negative refractive power, and a third lens group of positive refractive power, wherein in association with an object point distance change, among the first lens group, the second lens group, and the third lens group, only said second lens group is moved along an optical axis for focusing, with satisfaction of the following conditions (2) and (3):

$$0.7 < f_1/f < 1.0 \quad (2)$$

$$1.62 < f_2/f_1 < 2.75 \quad (3)$$

where
f is a focal length of the whole system upon focusing on a far point,
$f_1$ is a focal length of the first lens group, and
$f_2$ is an absolute value of a focal length of the second lens group.

* * * * *